United States Patent [19]

Diament et al.

[11] 4,012,848
[45] Mar. 22, 1977

[54] AUDIO-VISUAL TEACHING MACHINE FOR SPEEDY TRAINING AND AN INSTRUCTION CENTER ON THE BASIS THEREOF

[76] Inventors: Elza Samuilovna Diament, Profsojuznaya ulitsa, 87, korpus 3, kv. 79; Sergei Viktorovich Kiselev, ulitsa Novatorov, 42, korpus 1, kv. 32; Vladimir Leonidovich Monin, ulitsa Metallurgov, 22/22, kv. 69; Vyacheslav Vyacheslavovich Petrusinsky, ulitsa Malaya Jushumskaya 8, korpus 2, kv. 51; Vladimir Mikhailovich Pronin, ulitsa Chernyshevskogo, 21/25, kv. 3, all of Moscow, U.S.S.R.

[22] Filed: Feb. 19, 1976

[21] Appl. No.: 659,202

[52] U.S. Cl. .................................. 35/8 A; 35/9 R; 35/22 R; 35/48 R
[51] Int. Cl.² ........................................... G09B 5/06
[58] Field of Search ............. 35/8 R, 8 A, 9 R, 9 A, 35/22 R, 48 R

[56] References Cited
UNITED STATES PATENTS

| | | | |
|---|---|---|---|
| 3,060,795 | 10/1962 | Corrigan et al. ................ | 35/22 R X |
| 3,181,253 | 5/1965 | Candreva et al. ................ | 35/9 R X |
| 3,233,346 | 2/1966 | Cornberg ........................ | 35/8 R X |
| 3,357,115 | 12/1967 | Kelley ............................. | 35/22 R |
| 3,405,457 | 10/1968 | Bitzer ............................. | 35/9 R |
| 3,641,686 | 2/1972 | Krass ............................. | 35/22 R |
| 3,832,790 | 9/1974 | Fryer, Jr. et al. ................ | 35/22 R |
| 3,886,670 | 6/1975 | Lucien et al. ................... | 35/9 A |
| 3,942,516 | 3/1976 | Glynn et al. .................... | 35/22 R X |

Primary Examiner—William H. Grieb
Attorney, Agent, or Firm—Lackenbach, Lilling & Siegel

[57] ABSTRACT

An audio-visual teaching machine for speedy training comprising an operator's console intended for switching various educational programs and units in a required sequence; an educational information unit designed for playing back pre-recorded lesson information, instructions and service signals, its input being connected to an output of the operator's console; an audio-visual display unit for presenting aural and visual information to the student, the input of which being connected to an output of the educational information unit; an answer registering unit for registering the student's answers to educational information queries, its output being electrically connected to an input of the operator's console, comprises, according to the invention, a student's performance control unit which is a facility for producing signals to control the student's psychophysiological condition and his performance, an input of said control unit being connected with a respective output of the operator's console, and one output being connected with a respective input of the audio-visual display unit; a student's response registering unit intended for registering the student's psychophysiological responses; a student's condition checking unit which is a facility for evaluating the student's psychophysiological characteristics and comparing them with the reference values, one input of which being connected with an output of the student's response registering unit, the other input being connected to another output of the student's performance control unit, and an output being connected to a respective input of the operator's console; a comparator unit which compares the number of the student's answers to a certain amount of educational material with a reference number of answers and generates a signal indicating a required number of reviews of said amount of educational material, wherein one input is connected to an output of the answer registering unit, the other input is connected to another output of the educational information unit, and an output is connected to a respective output of the operator's console.

38 Claims, 44 Drawing Figures

AUDIO-VISUAL TEACHING MACHINE FOR SPEEDY TRAINING AND AN INSTRUCTION CENTER ON THE BASIS THEREOF

The present invention relates to speedy teaching techniques and apparatus and may be used for speedy teaching of various theoretical subject matters, including foreign languages and professional motor skills, to students without an instructor.

For a better understanding of the text explanations of special terms used in the description of the present teaching complex are given below.

By subsensory response is meant the response to signals at or below the threshold level of the student's conscious perception.

By suggestive form of presentation of educational information, instructions and control signals is understood a combination of audio and visual signals containing elements of indirect suggestion aimed at stimulating various activities of the student and overcoming the psychological barriers that prevent the student from assimilating large amounts of information.

Biostimulation in the present context is the application of stimuli to electrically active points of a human body.

Suggestive control is the control of the student's psychophysiological condition through applying signals in suggestive form.

By the suggesto-cybernetic speedy teaching method is meant the teaching process using cybernetic techniques, methods and apparatuses that enables control of the student's performance in the course of training through suggestive and subsensory stimuli, evaluation of the student's psychophysiological characteristics and perceptional features prior to beginning of the educational process, and presentation of educational information in accordance with the individual features of the student.

By a functional scene is understood the music which contains components timed with the rate of the main biological processes of a student.

Suggestivity is the ability of the student to respond subconsciously to suggestive and subsensory control stimuli.

By emotional-semantic modulation of educational information is meant the formation of verbal signals in the form of semantic blocks causing in the student various emotional responses which can be objectively registered.

The problem which has recently become particularly critical is that each person has to assimilate a huge amount of necessary information and this requires more and more time. Thus it is now tremendously important to find ways and means of intensifying the teaching process which would help to appreciably speed up the teaching process and to improve its efficiency. The main lines of research in this field are development of technical facilities for speedy training, improvement of teaching methods, and work to intensify the educational process without increasing the fatigue and emotional stress of the students. The use of conventional equipment and techniques failed to give a desired effect. This invention employs a radically new approach to the solution of this problem. Educational information is presented to the student so as to optimize as much as possible psychophysiological conditions for perception of this information.

The proposed suggesto-cybernetic method of intensified teaching is a generalization of the known effective methods of speedy teaching, suggestive and cybernetic control of the student's performance in the course of training.

A known speedy teaching technique suggested by G.K. Lozanov (Lozanov G. K. Suggestology. Science and Art. Sofia, 1971) consists in presenting educational information in suggestive form by a teacher accompanied by a functional scene. Suggestive form of representing information in Lozanov's method is obtained by using verbal signals with changing intonation which ensures regular presentation of lesson material, reflex memorizing, and two levels of perception (conscious and subconscious). Representation of educational information signals in suggestive form stimulates the emotional tone of the student and his psychological orientation to hypermnesia (super memory), creates play situations in teaching, helps hypermnesia, provides unconstrained communication and promotes automatic reproduction of the educational material by the students. The student's perceptive abilities are also stimulated by a large amount of linguistic information to be memorized in combination with variation of the student's condition from pseudopassive to active responsiveness. In Lozanov's method the basic educational element is a teacher, however, technical facilities may also be used for playing back functional scene signals and instructions and for presenting visual information. Lozanov's method raises the efficiency of teaching by about three times with respect to the number of characteristics as compared with the traditional teaching techniques.

However, Lozanov's intensive training cannot be accomplished by technical facilities alone without a specially trained high-skill teacher. In Lozanov's course of teaching, the performance level is not registered objectively, and the teaching program is corrected and adjusted by the teacher on the basis of his personal views of the students' performance and abilities. Lozanov's method is suitable only for education by teachers who have been specially trained in a teaching center headed by G. K. Lozanov.

The prior art audio-visual teaching device comprises an operator's console, an educational information unit with audiomessages recorded on a record and a printed page, the input of the educational information unit being connected to the operator's console, an audio-visual phonographic unit with its input connected to the educational information unit, and an answer registering unit connected to the operator's console. The educational information unit has a manually-controlled index head carrying a pointer which can be shifted along the edge of the page. The printed page may be an individual program sheet or a page of a book or manual.

The record is prerecorded in separate bands with a sound intelligence coordinated with the respective visual items on the printed page. The index head is set to a required position and appropriate audio information is played for the student. If the student's answer is correct, the index head is set to a next position and the next segment of lesson information is reproduced.

Another prior-art audio-visual teaching device comprises an operator's console, a teaching program unit with its input connected to the operator's console, an audio-visual display unit connected to the teaching program unit and containing loudspeakers and earphones, and an answer registering unit connected to the operator's console. Lesson information is conveyed from the information unit into the loudspeakers. After having listened to educational information, the students start making exercises. In response to the students' answers to specific questions, additional informative data and instructions are presented to each student through his individual earphones. The device is applicable only where the teaching course may be divided into a basic course and appropriate exercises.

Also known in the prior art is an audio-visual apparatus for teaching which is intended for presenting visual and aural tutorial information to the student and which comprises a program control acting as an operator's console with its output connected to an educational information unit with a plural track information record, wherein the information of each track is prerecorded at a different record speed and is coordinated with corresponding visual lesson items, the output of which is connected to an audio-visual reproducing device, an answer registering unit intended for registering the student's answers, and an examination control for comparing the student's answer with a reference answer and evaluating its correctness, whose input is connected to the answer registering unit and whose output is connected to the program control. The above audio-visual apparatus for teaching is capable of reacting to student response to alter the tutoring program accordingly. Audiovisual lesson information is pre-recorded on plural record tracks at different speeds. First the information is offered for a student's consideration at the highest speed. If the student's answer is correct, the next segment of lesson information is presented; an incorrect answer alters the lesson course to a different record track which is pre-recorded at a reduced speed. Playing back of the lesson unit is repeated until a correct answer is received from the student, whereupon the student is advanced to a next information unit. In response to the evaluation of several student answers, the apparatus provides branching towards more difficult and less difficult information presentations.

A known instruction center intended for teaching both individual students and classes of students comprises a central control unit with a computer and an educational information unit. The instruction center also comprises several classrooms each of which is provided with an audio-visual display device and an answer registering device for registering students' answers. In addition, the instruction center contains a queri device, the inputs thereof being connected to the answer registering unit of each classroom and the output thereof being connected to the control unit, and an answering device, the input thereof being connected to the control unit, whereas the outputs are connected to the audiovisual display units. In response to a signal delivered from the answer registering unit, the queri device selects a required subject matter from the educational information unit. The selected lession information is transmitted through the answering device to the audio-visual display unit. In this manner, two-way communication of the control unit with each classroom is effected, though a different subject may be taught in each classroom.

However, known audio-visual devices and instruction center on the basis thereof make it impossible to check the student's condition and control his performance in the course of the learning process. These devices employ only conscious sensory information perception channels, and have no facilities for presenting lesson information, instructions and control signals in suggestive forms. Peculiar features of information assimilation by individual students and the rate of the assimilation are made obvious only in the course of teaching, the teaching program is altered only after the teaching results are obtained.

The known audio-visual teaching devices and the instruction center lack means for creating psychlological situations that would stimulate the learning process. The known teaching devices and the instruction center conduct only programed instruction with linear and branching programs, and do not have facilities for teaching professional and motor skills nor for speedy training.

The use of computers enhances teaching cost and requires high-skill specialists for operating the machines.

The suggesto-cybernetic speedy teaching method which is proposed in this invention is based on suggestive teaching principles, cybernetic principles and means of controlling the student's performance, optimization of the forms in which educational material is presented to the student and creation of situations that stimulate the learning process, and can be realized through an audio-visual teaching machine and an instruction center as the basis thereof.

It is an object of the invention to raise the efficiency of the teaching process and to reduce the term for teaching various theoretical subjects and professional motor skills.

It is another object of the invention to provide an audiovisual teaching machine for speedy training and an instruction center as the basis thereof which make it possible to realize speedy training without an instructor, and including means of teaching based on the principles of suggestion and cybernetics.

It is still another object of the invention to provide a speedy teaching method which reduces the student's fatigue and stress and permits an objective check of his general condition.

In accordance with the invention, the audio-visual teaching machine for speedy training comprises an operator's console intended for switching various teaching programs and units in a required sequence; an educational information unit for playing back pre-recorded lesson information, instructions and service messages which has its input connected to the output of the operator's console; an audio-visual display unit for presenting aural and visual tutorial information to the student with the input thereof being connected to the output of the educational information unit; and an answer registering unit designed for registering the student's answers to given queries or tasks with the output thereof being electrically connected to the operator's console input, said answer registering unit comprises a student's performance control unit, which is a facility for playing back signals to control the psychophysiological condition of the student and his performance, with an input connected to an appropriate output of the operator's console and one output connected to an appropriate input of the audiovisual display unit, a student's response registering unit intended for registering the student's psychophysiological responses to the information presented, a studnet's condition check unit, which is a facility for evaluating the student's psychophysiological characteristics and comparing them with the predetermined response, with one input connected with an output of the student's response registering unit, the other input connected with a second output of the student's performance control unit, and the output connected to an appropriate input of the operator's console, and a comparator unit, which compares the number of the student's answers to given queries or tasks with a reference number of answers and generates a signal initiating a required number of reviews of said amount of educational information, with one input connected to the output of the answer registering unit, the other input connected to a second output of the educational information unit, and the output connectd to an appropriate input of the operator's console.

According to one embodiment of the invention, the teaching machine may have a biostimulation unit comprising means for generating electric pulses to stimulate the electrically active points of a human body with the input thereof connected to an appropriate output of the operator's console, as an assembly of electrodes attached to the student's body for transmitting electric pulses to the body surface, the input of which being connected to the biostimulation unit output.

According to another embodiment of the invention, the teaching machine may comprise a motor activity control unit with a means for generating electric signals to control the student's muscular performance with the input connected to an appropriate output of the educational information unit, and an assembly of electrodes attached to the student's body for transmitting electric pulses to the student's muscles, the input of the assembly being connected to the output of the motor activity control unit.

It is advantageous that the student's performance control unit is a device for automatically playing back to the student psychophysiological testing signals, programmed self-training signals, suggestive control messages, subsensory control messages, exterior stimuli and functional scene signals, and which comprises a tests unit, a self-training unit, a suggestive signal producing unit, a subsensory signal producing unit, an exterior stimilus producing unit, a functional scene unit whose inputs serve as an input of the student's performance control unit, and an adder the inputs of which connect, respectively, one output of the tests unit, an output of the self-teaching unit, an output of the suggestive signal producing unit, an output of the subsensory signal producing unit, an output of the exterior stimulus producing unit, and an output of the functional scene unit, whereas the adder output is an output of the student's performance control unit, a second output of the tests unit serving as the other output of the student's performance control unit.

Also in accordance with the invention, the instruction center comprises a classroom for testing and checking the student's condition in which synchronized audio-visual signals of psychophysiological and special tests are presented to the student and the student's electrophysiological characteristics and responses are registered, the input of the classroom being connected to an appropriate output of the central console and the output being connected to an appropriate input of the central console; a classroom for stimulating the student's performance and for suggestive control of his condition where suggestive and subsensory condition control signals, programmed self-training and reflex reinforcement signals are presented to the student, the input being connected to an appropriate output of the central console and the output being connected to a respective input of the central console; a passive information assimilation classroom for offering synchronized audio-visual educational information signals and instructions for a student's consideration, the input being connected to a respective output of the central console and the output being connected to a respective input of the central console; a classroom for bringing memorized material into active use where tutorial information messages are presented to the student in suggestive form enabling stimulation of the student's verbal performance, an input being connected to a respective output of the central console and the output being connected to a respective input of the central console; a classroom for presenting educational information to the student at the rate of his biological processes where audio and visual lesson signals are placed with one of main biological processes of said student, an input being connected to a respective output of the central console and the output being connected to a respective input of the central console; a sensory-motor training classroom intended for teaching professional motor skills by playing back instruction information messages in synchronism with signals stimulating the student's muscular activity, an input being connected to a respective output of the central console and an output being connected to a respective input of the central console; a relaxation and programmed sleep classroom for self-training of the student with a view to improving his performance and for programed sleep sessions, an input being connected to a respective output of the central console and the output being connected to a respective input of the central console; and a programmed rest classroom for the student's active recreation between the lessions, an input being connected to a respective output of the central console and the output being connected to a respective input of the central console, the audio-visual teaching machine in each classroom being one of the embodiments of the invention described above.

it is advantageous that the classroom for testing and checking the student's condition comprises an operator's console, an educational information unit, a student's performance control unit, an audio-visual display unit, an answer registering unit, a comparator unit, a student's response registering unit, a student's condition checking unit, a biostimulation unit, an assembly of electrodes of the audio-visual teaching machine, an assembly of biotransmitters, and a multi-parameters recorder for registering the student's biological processes with its input connected to the output of the assembly of biotransmitters, the operator's console having an additional input which serves as an input of the testing classroom and an additional output which serves as the output of the testing classroom.

It is also advantageous that the classroom for stimulating the student's performance and for suggestive control of his condition comprises an operator's console, a student's performance control unit, an audio-visual display unit, a student's response registering unit, a student's condition checking unit, a biostimulation unit, an assembly of electrodes of the audiovisual teaching machine, and a reflex reinforcement unit for enhancing suggestive stimuli with its input connected to one output of the student's performance control unit, the operator's console having an additional input which serves as the stimulation classroom's input and an additional output which serves as the stimulation classroom's output.

It is preferably that the classroom for passive assimilation of educational information comprises an operator's console, an educational information unit, a student's performance control unit, an audio-visual display unit, an answer registering unit, a comparator unit, a student's response registering unit, and a student's conditions checking unit of the audio-visual teaching machine, the operator's console having an additional input which serves as an input of the passive assimilation classroom, and an additional output which serves as output of the passive assimilation classroom.

It is also preferable that the classroom for bringing memorized material into active use comprises an operator's console, an educational information unit, a student's performance control unit, an audio-visual display unit, an answer registering unit, a comparator unit, a student's response registering unit, and a student's condition checking unit of the audio-visual teaching machine, an earphone unit with the input thereof connected to one output of the educational information unit, and a timing device for generating a light signal in case the student fails to answer in allotted time, the input of which being connected to the output of the answer registering unit, the operator's console having an additional input which serves as an input of the classroom for bringing memorized material into active use and an additional output which serves as an output of this classroom.

It is further preferable that the classroom for presenting educational information to the student at the rate of the student's biological processes comprises an operator's console, an educational information unit, an audio-visual display unit, an answer registering unit, a comparator unit of the audio-visual teaching machine, an assembly of biotransmitters, and a timer to synchronize the place of presenting educational information with one of the student's main biological processes, the input of which being connected to an output of the assembly of biotransmitters and the output being connected to the input of the educational information unit, the operator's console having an additional input which acts as an input of the classroom for presenting educational information at the rate of biological processes and an additional output which acts as an output of the classroom for presenting educational information at the rate of the student's biological processes.

It is advisable that the sensory-motor training classroom comprises an operator's console, an educational information unit, a student's performance control unit, an audio-visual display unit, an answer registering unit, a comparator unit, a student's response registering unit, a student's condition checking unit, an electrode assembly, a motor activity control unit of the audio-visual teaching machine, and a trainer for exercising professional motor skills, with the output thereof connected to the answer registering unit input, the operator's console having an additional input which acts as an input of the sensory-motor training classroom, and an additional output which acts as an output of the sensory-motor training classroom.

It is also advisable that the relaxation and programmed sleep classroom comprises an operator's console, a student's performance control unit, an audio-visual display unit, a student's response registering unit, a student's condition checking unit of the audio-visual teaching machine, and a quasi-natural light stimulation unit for imitating natural illumination corresponding to various situations, the input of which being connected to one output of the student's performance control unit, the operator's console having an additional input which serves as the relaxation classroom's input and an additional output which serves as the relaxation classroom's output.

It is also advisable that the programmed rest classroom comprises an operator's console, a student's performance control unit, an audio-visual display unit, a student's response registering unit, a student' condition checking unit of the audio-visual teaching machine, and a graded physical load unit with the output thereof connected to the response registering unit's input, the operator's console having an additional input which serves as an input of the programmed rest classroom, and an additional output which serves as an output of the programmed rest classroom.

Also in accordance with the invention the speedy training method consists of the following sequence of operations;

preformed and recorded audio-visual instruction signals, psychophysiological testing signals, self-training signals, suggestive control messages, subsensory control messages, functional scene signals, signals of special tests on a particular subject matter in the form of a session for testing the student, reference values of responses to psychophysiological tests, a reference number of answers to special test signals and data on characteristics of various groups of students are incorporated in the teaching machine;

the student's biological characteristics are registered before the start of the testing session;

psychophysiological testing signals are presented to said student;

the responses of said student to the psychophysiological testing signals are registered;

the signals of special tests on a particular subject matter are presented to said student;

the student's answers to the special testing signals are registered;

on the basis of the registered biological characteristics, responses and answers of the, the student is graded, i.e. assigned to a particular teaching group;

preformed and recorded audio-visual instruction signals, suggestive and subsensory messages, functional scene and psychophysiological testing signals, reflex reinforcement signals in the form of a performance stimulation session for controlling the student's performance, and reference response values for different performance levels are incorporated in the teaching machine;

instruction signals, suggestive control messages and psychophysiological testing signals are presented to said student simultaneously with the functional scene signals;

the student's responses to the psychophysiological testing signals are registered;

the level of the student's performance is determined from the registered response data;

reflex reinforcement signals and suggestive and subsensory messages are presented to the student;

the student's responses are registered;

the level of the student's performance is estimated;

said operations of the performance stimulation session are repeated until the student's performance reaches a desired level;

preformed and recorded audio-visual instruction signals, educational information and self-training signals, suggestive and subsensory control messages, exterior stimuli, psychophysiological testing signals in the form of teaching sessions for said student, reference values of responses to estimate the performance level, a reference number of answers for each teaching session, and the performance level value are incorporated in the teaching machine;

instruction and educational information signals are presented to the student;

the answers of said student are registered;

the representation of the educational information signals is interrupted randomly;

exterior stimuli are applied after the previous operation with a view to maintaining and restoring the subsiding orientation response of said student;

the representation of educational information signals is interrupted regularly;

after the previous operation psychophysiological testing signals are presented;

the responses of said student are registered;

the student's performance level is determined;

if the student's performance level is other than the preset value, the functional scene is changed depending on the nature and magnitude of the deviation, and subsensory and suggestive control messages are presented to the student together with educational information signals;

the presentation of educational information signals and subsensory and suggestive control messages is interrupted;

psychophysiological testing signals are presented;

the student's responses are registered;

the student's performance level is determined;

if the performance level of said student has been restored, educational information signals are presented without suggestive and subsensory messages;

if the deviation of the student's performance from the preset level persists, self-training and psychophysiological testing signals are presented to the student;

the responses of said student are registered;

the student's performance level is estimated;

self-training and psychophysiological testing signals are presented within a preset time period until the student's performance has reached a desired level;

if the deviation of the student's performance from the preset level still persists after the elapse of a certain time period, the teaching session is interrupted;

the performance stimulation session is conducted;

after the performance has reached a desired level the interrupted teaching session is resumed;

after said teaching session has been completed, the number of said student's answers is compared with the reference number of answers;

if the number of the student's answers is equal to the reference number of answers, further teaching is conducted in accordance with a preset program for a given group of students;

if the number of the student's answers is not equal to the reference number of answers, the number of reviews of said teaching session and the sequence of the sessions are changed depending on the magnitude and sign of the deviation;

educational information signals in the form of presenting educational information to the student at the rate of his biological processes and the reference number of answers are incorporated in the teaching machine;

educational information signals are synchronized with one of the main biological processes of the student;

educational information signals are presented to the student;

the student's answers are registered;

after the completion of the presentation of information at the rate of the student's biological processes the number of said student's answers is compared with the reference number of answers;

if the number of the student's answers is equal to the reference number, further teaching is conducted according to the preset program;

if the number of the student's answers deviates from the reference number of answers, the teaching program is changed depending on the magnitude and sign of the deviation;

after completion of the teaching sessions, reference educational information signals in the form of a student's proficiency checking session and a reference number of answers are incorporated in the teaching machine;

reference educational information signals are presented to said student;

the student's answers are registered;

if the number of the student's answers is smaller than the reference number of answers, additional teaching sessions are presented to the student; and if the number of said student's answers is equal to, or larger than, the reference number of answers, the teaching process is stopped.

It is advisable for expanding the range of the student's performance control that the teaching method proposed in the present invention comprise the following sequence of operations:

electric pulses to stimulate electrically active points of a human body are generated by the teaching machine;

in the course of a testing session the electrically active points of the student's body are stimulated by electric pulses;

the biological characteristics of said student are registered;

according to the nature of change in the biological characteristics, the student is graded;

in the course of teaching sessions the performance level of said student is estimated; and should the student's performance deviate from the preset level, electric pulses are applied to stimulate the electrically active points of the student's body.

It is advisable that the teaching method for speedy teaching of foreign languages comprise the following operations:

preformed and recorded instruction signals and the signals of the basic and supplementary educational information are incorporated in the teaching machine, said signals of the basic and supplementary educational information being presented in the form of texts and words in a foreign language with parallel translation and being presented to the student at the sessions of passive assimilation of educational information, the sessions of bringing memorized material into active use, the sessions of presenting tutorial information at the rate of the student's biological processes, and the proficiency check sessions;

the instruction signals and the signals of the basic and supplementary educational information are presented to the student in the form of sessions of passive assimilation of educational material;

the student's answers are registered at the level of recognizing foreign words and phrases;

the student is presented instruction signals and the signals of the basic and supplementary educational information at the sessions of bringing memorized material into active use, where the basic educational information is offered in the form of tasks and questions at the sensory level, while supplementary lesson material is presented in the form of key signals and answer signals at the threshold level;

the student's answers are registered at the level of repeating foreign words and phrases;

presentation of foreign words and phrases with parallel translation is placed with one of the student's main biological processes;

the student is presented said foreign words and phrases at the session of offering educational material at the rate of his biological processes;

the student's answers are registered;

the student is presented signals of the basic educational information without parallel translation at a proficiency check session; and the student's answers are registered at the level of reproducing the educational material.

It is advisable that the teaching method for speedy training in professional motor skills comprise the following operations:

electric signals for controlling the student's muscular activity to control his performance are generated by the teaching machine;

said electric signals are timed with educational information signals; and in the course of training said synchronized electric signals are used to stimulate the student's muscles involved in the motor skill being taught.

It is advisable that the teaching method for rest and restoring the student's performance comprise the following operations:

preformed and recorded instruction signals, suggestive and subsensory control messages, and functional scene signals intended to restore the student's performance are incorporated in the teaching machine at an active rest session, together with music and movie programs;

suggestive and subsensory messages are presented together with functional scene signals;

the student is presented instructions to perform a series of physical exercises;

physical exercises are prescribed in accordance with the age and physical development of said student;

entertainment music and movie programs are presented; and functional scene signals are presented.

The present invention makes it possible to appreciably speed up the teaching process, to improve the efficiency of lesson material assimilation and to carry out the teaching process without an instructor. As compared with the traditional teaching methods, the educational time requirement to obtain the same learning efficiency is about one order less in the present machine. Thus, for instance, 100 hours (10–12 days) of teaching a foreign (European) language on the machine of the present invention gives about the same effect as 1000 teaching hours (1.5–2.5 years of regular studies at foreign language courses) using traditional methods. The machine of the present invention does not require the intervention of the instructor in the teaching process. Biostimulation expands the range of controlling the student's psychophysiological characteristics and his performance. The invention can be successfully used for teaching professional skills, for example, 3–4 days of teaching ten-digit typing gives the trainee a professional typist's speed. The invention allows the control of student's condition without involving his conscious perception and the elimination of fatigue when assimilating large amounts of information within a short period. The invention provides conditions for adequate assimilation of information by students and creates situations which stimulate response to various stimuli in educational lessons and various activities of the student. Taking into account that the cost of the machine and instruction center is about equal to the cost of conventional modern teaching equipment, the use of the present invention ensures an economic saving of about 10 times due to a shorter teaching period.

Other objects and advantages of the invention can be more fully understood from the following description thereof when read with reference to the accompanying drawings, in which.

Figure 1:
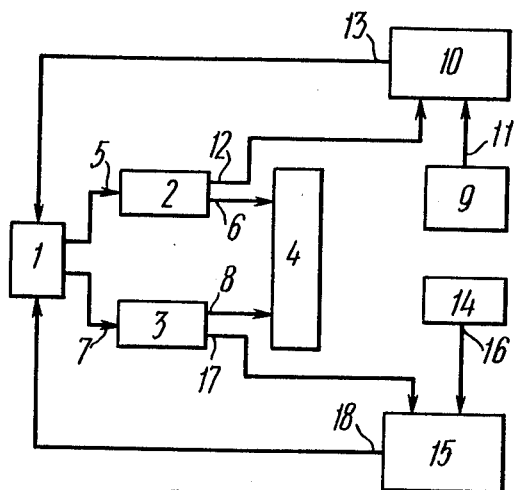
FIG. 1 is a block diagram of the audio-visual teaching machine for speedy training embodying the present invention.

The audio-visual teaching machine for speedy training comprises an operator's console 1 (FIG. 1), an educational information unit 2, a student's performance control unit 3, and an audio-visual display unit 4. An input 5 of the unit 2 is connected with a respective output of the operator's console 1, and an output 6 is connected with a respective input of the display unit 4.

An input 7 of the unit 3 is connected with a respective output of the operator's console 1, and an output 8 is connected with a respective input of the unit 4. According to the invention, the audio-visual teaching machine also comprises an answer registering unit 9 and a comparator unit 10. One input of the unit 10 is connected with an output 11 of the unit 9, and the other input of the unit 10 is connected with an output 12 of the unit 2. An output 13 of the unit 10 is connected with a respective input of the operator's console 1. The machine also contains a student's response unit 14 and a student's condition checking unit 15. One input of the unit 15 is connected with an output 16 of the unit 14, the other input of the unit 15 is connected with an output 17 of the unit 3, and an output 18 is connected with a respective input of the operator's console 1.

With a view to expanding the control range of the student's psychophysiological processes and his performance, the audiovisual teaching machine comprises a biostimulation unit 19 (FIG. 2) and an electrodes assembly 20. An input 21 of the unit 19 is connected with a respective output of the operator's console 1, and an output 22 is connected with an input of the electrodes assembly 20.

With a view to enhancing the efficiency of teaching professional motor skills, the audio-visual teaching machine comprises a motor activity control unit 23 (FIG. 3) and an electrodes assembly 20. An input 24 of the unit 23 is connected with the output 6 of the unit 2, and an output 25 is connected with an input of the electrodes assembly 20.

The student's performance control unit 3 (FIG. 4) comprises a student's condition tests unit 26, a self-training unit 27, a suggestive signal producing unit 28, a subsensory signal producing unit 29, an exterior stimulus producing unit 30, a functional scene unit 31, and an adder 32. An input 33 of the unit 26, an input 34 of the unit 27, an input 35 of the unit 28, an input 36 of the unit 29, an input 37 of the unit 30 and an input 38 of the unit 31 constitute the input 7 of the student's performance control unit 3. An output 39 of the unit 26, an output 40 of the unit 27, an output 41 of the unit 28, an output 42 of the unit 29, an output 43 of the unit 30 and an output 44 of the unit 31 are connected with respective inputs of the adder 32 which has an output 8. The unit 26 also has an output 17. The units 26, 27, 28, 29, 30 and 31 used in the unit 3 are standard stereophonic tape recorders. The adder 32 is a matrix addition circuit.

The proposed instruction center helps create psychological situations which stimulate the learning process through the use of specially equipped classrooms, each classroom being intended for a particular teaching session, i.e. all conditions for adequate assimilation of educational information by the students are provided. The audio-visual teaching machine used in the instruction center makes it possible to check the progress of each student in the course of teaching and to change the level of his performance and the characteristics of signals presented to him depending on variations in the student's condition, which enhances the efficiency of the teaching process appreciably.

Figure 5:
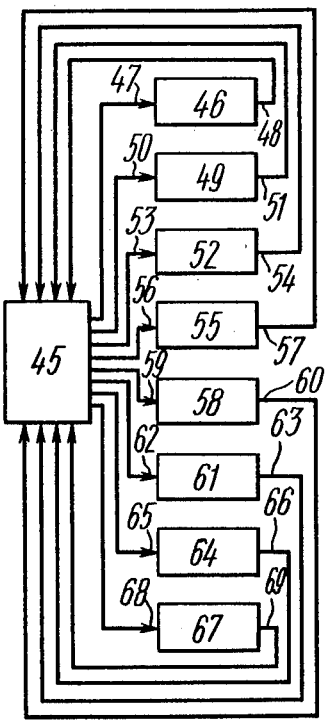
FIG. 5 is a block diagram of an instruction objects the basis of the proposed machine, according to the invention.

The instruction center as the basis of the audiovisual teaching machine for speedy training comprises a central console 45 (FIG. 5); a classroom 46 for testing and checking the student's condition, with an input 47 connected to a respective output of the console 45, and an output 48 connected to a respective input of the console 45; a classroom 49 for stimulation of the student's performance and suggestive control of his condition, with an input 50 and an output 51 connected to a respective output and a respective input of the console 45; a classroom 52 for passive assimilation of educational information, with an input 53 and an output 54 connected to a respective output and an respective input of the central console 45; a classroom 55 for bringing memorized material into active use, with an input 56 and an output 57 connected to a respective output and a respective input of the console 45; a classroom 58 for presenting educational information at the rate of the student's biological processes, with an input 59 and an output 60 connected to a respective output and a respective input of the console 45; a sensory-motor training classroom 61, in which an input 62 and an output 63 connected to a respective output and a respective input of the console 45; a relaxation and programmed sleep classroom 64, with an input 65 and an output 66 connected to a respective output and a respective input of the console 45; and a programmed rest classroom 67, with an input 68 and an output 69 connected to a respective output and a respective input of the console 45.

FIG. 6, 7, 8, 9, 10, 11, 12 and 13 show the diagrams of individual classrooms comprised in the instruction centre.

Each of the classrooms includes a room 70 which has special acoustic facilities, a student's workplace 71, and an equipment room 72 which houses the main units of the audiovisual teaching machine.

The classroom 46 (FIG. 6) for testing and checking the student's condition comprises an operator's console 1, an educational information unit 2, a student's performance control unit 3, a biostimulation unit 19, a comparator unit 10, a condition checking unit 15, and a multi-parameter recorder 73, all housed in the equipment room 72. One input of the operator's console 1 is an input 47 of the classroom 46, and one output of the operator's console 1 is an output 48 of the classroom 46. The input 5 of the unit 2, the input 7 of the unit 3, and the input 21 of the unit 19 are connected to respective outputs of the operator's console 1. The output 13 of the unit 10 and the output 18 of the unit 15 are connected to respective inputs of the operator's console 1.

The classroom 46 also comprises an audio-visual display unit 4 located in the room 70. The output 6 of the unit 2 and the output 8 of the unit 3 are connected to respective inputs of the unit 4.

The student's workplace 71 has the following built-in units: the answer registering unit 9, the response registering unit 14, the electrodes assembly 20, and the assembly 74 of biotransmitters. The output 11 of the unit 9 and the output 12 of the unit 2 are connected to respective inputs of the unit 10, and the output 16 of the unit 14 and the output 17 of the unit 3 are connected to respective inputs of the unit 15. The output 22 of the unit 19 is connected to an input of the unit 20. An output 75 of the assembly 74 is connected to an input of the multi-parameter recorder 73.

The classroom 49 (FIG. 7) for stimulation of the student's performance and for suggestive control of his condition comprises the operator's console 1, the performance control unit 3, the biostimulation unit 19, and the condition checking unit 15, all housed in the equipment room 72. One input of the operator's console 1 is the input 50 of the classroom 49, and one output of the operator's console 1 is the output 51 of the classroom 49. The input 7 of the unit 3 and the input 21 of the unit 19 are connected to respective outputs of the console 1. The classroom 49 also comprises the audio-visual display unit 4 and a reflex reinforcement unit 76 housed in the room 70. The output 8 of the unit 3 is connected to the input of the unit 4 and to an input 77 of the unit 76. The student's response unit 14 and the electrodes assembly 20 are built into the student's workplace 71. The output 16 of the unit 14 and the output 17 of the unit 3 are connected to respective inputs of the unit 15. The output 18 of the unit 15 is connected to a respective input of the operator's console 1.

The classroom 52 (FIG. 8) for passive assimilation of educational information comprises the operator's console 1, the educational information unit 2, the student's performance control unit 3, the comparator unit 10, and the student's condition checking unit 15, all housed in the equipment room 72. One input of the operator's console 1 is the input 53 of the classroom 52, and one output of the operator's console 1 is the output 54 of the classroom 52. The input 5 of the unit 2 and the input 7 of the unit 3 are connected to respective outputs of the console 1. The output 13 of the unit 10 and the output 18 of the unit 15 are connected to respective inputs of the operator's console 1. The classroom 52 also comprises an audio-visual display unit 4 situated in the room 70. The output 6 of the unit 2 and the output 8 of the unit 3 are connected to respective inputs of the unit 4. The classroom 52 also comprises the answer registering unit 9 and the response registering unit 14 built into the student's workplace 71. The output 11 of the unit 9 and the output 12 of the unit 2 are connected to respective inputs of the unit 10. The output 16 of the unit 14 and the output 17 of the unit 3 are connected to respective inputs of the unit 15.

The classroom 55 (FIG. 9) for bringing memorized material into active use comprises the operator's console 1, the educational information unit 2, the student's performance control unit 3, the comparator unit 10, and the student's condition checking unit 15, all housed in the equipment room 72. One input of the operator's console 1 is the input 56 of the classroom 55, and one output of the console 1 is the output 57 of the classroom 55. The input 5 of the unit 2 and the input 7 of the unit 3 are connected to respective outputs of the console 1. The output 13 of the unit 10 and the output 18 of the unit 15 are connected to respective inputs of the console 1. The classroom 55 also comprises the audio-visual display unit 4 and a timing device 78 located in the room 70. The output 6 of the unit 2 and the output of the unit 3 are connected to respective inputs of the unit 4. The classroom 55 also contains the answer registering unit 9, the response registering unit 14, and an earphone unit 79 built into the student's workplace 71. An input 80 of the timing device 78 is connected to the output 11 of the unit 9. An input 81 of the unit 79 is connected to the output 6 of the unit 2. The output 11 of the unit 9 and the output 12 of the unit 2 are connected to respective inputs of the unit 10. The output 16 of the unit 14 and the output 17 of the unit 3 are connected to respective inputs of the unit 15.

The classroom 58 (FIG. 10) for presenting educational information at the rate of the student's biological processes comprises the operator's console 1, the educational information unit 2, and the comparator unit 10, all housed in the equipment room 72. One input of the console 1 is the input 59 of the classroom 58, and one output of the console 1 is the output 60 of the classroom 58. The input 5 of the unit 2 is connected to the other output of the console 1. The output 13 of the unit 10 is connected to the other input of the console 1. The classroom 58 also comprises the audio-visual display unit 4 and a timer 82 located in the room 70.

The output 6 of the unit 2 is connected to the input of the unit 4. An output 83 of the unit 82 is connected to the input 5 of the unit 2. The classroom 58 also comprises the answer registering unit 9 and the assembly 74 of biotransmitters built into the student's workplace 71. The output 75 of the unit 74 is connected to the input of the timer 82. The output 11 of the unit 9 and the output 12 of the unit 2 are connected to respective inputs of the unit 10.

The sensor-motor training classroom 61 (FIG. 11) comprises the operator's console 1, the educational information unit 2, the student's performance control unit 3, the comparator unit 10, the student's condition checking unit 15, and the motor activity control unit 23, all housed in the equipment room 72. One input of the console 1 is the input 62 of the classroom 61, and one output of the console 1 is the output 63 of the classroom 61. The input 5 of the unit 2 and the input 7 of the unit 3 are connected to respective outputs of the operator's console 1. The output 13 of the unit 10 and the output 18 of the unit 15 are connected to respective inputs of the console 1. The input 24 of the unit 23 is connected to the output 6 of the unit 2. The classroom 61 also comprises the audio-visual display unit 4 and a trainer 84 situated in the room 70. The output 6 of the unit 2 and the output 8 of the unit 3 are connected to respective inputs of the unit 4. The classroom 61 also comprises the answer registering unit 9, the response registering unit 14 and the electrodes assembly 20 built into the student's workplace 71. An output 85 of the trainer 84 is connected to the input of the unit 9. The output 25 of the unit 23 is connected to the input of the unit 20. The output 11 of the unit 9 and the output 12 of the unit are connected to respective inputs of the unit 10. The output 16 of the unit 14 and the output 17 of the unit 3 are connected to respective inputs of the unit 15.

The relaxation and programmed sleep classroom 64 (FIG. 12) comprises the operator's console 1, the student's performance control unit 3, and the student's condition checking unit 15, all housed in the equipment room 72. One input of the console 1 is the input 65 of the classroom 64, and one output of the console 1 is the output 66 of the classroom 64. The input 7 of the unit 3 is connected to the other output of the console 1. The output 18 of the unit 15 is connected to the other input of the console 1. The classroom 64 also comprises the audio-visual display unit 4 and a quasi-natural light stimulation unit 86 located in the room 70. The output 8 of the unit 3 is connected to the input of the unit 4 and to an input 87 of the unit 86. The classroom 64 contains also a response registering unit 14 built into the student's workplace 71. The output 16 of the unit 14 and the output 17 of the unit 3 are connected to respective inputs of the unit 15.

The programmed rest classroom 67 (FIG. 13) comprises the operator's console 1, the student's performance control unit 3, and the student's condition checking unit 15, all housed in the equipment room 72. One input of the console 1 is the input 68 of the classroom 67, and one output of the console 1 is the output 69 of the classroom 67. The output 18 of the unit 15 is connected to the other input of the console 1. The input 7 of the unit 3 is connected to the other output of the console 1. The classroom 67 also comprises the audio-visual display unit 4, a graded physical load unit 88, and the response registering unit 14 located in the room 70. The output 8 of the unit 3 is connected to the input of the unit 4. An output 89 of the unit 88 is connected to the input of the unit 14. The output 16 of the unit 14 and the output 17 of the unit 3 are connected to respective inputs of the unit 15.

Figure 14:
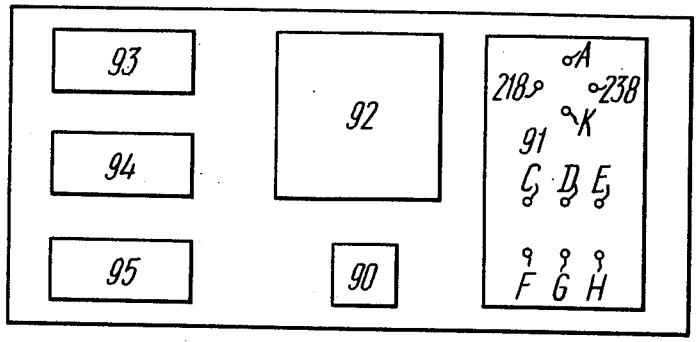
FIG. 14 is a schematic external view of the operator's console, according to the invention.

The panel of the operator's console 1 (FIG. 14) has an on/off toggle switch 90 for connecting the console 1 to mains, a switching unit 91 containing switches of the audio-visual teaching machine units, an intercommunication device 92, an indicator 93 indicating the reference number of the student's answers, a unit 94 of student's answer counters, and a student's condition indicator unit 95.

Figure 3:
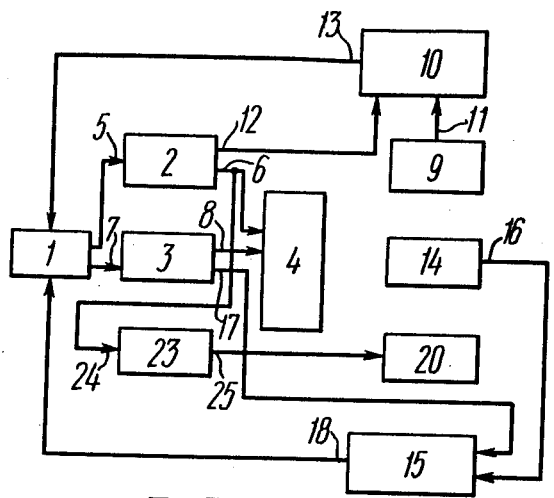
FIG. 3 is a block diagram of the audio-visual teaching machine for speedy training with a motor activity control unit embodying the present invention.
Figure 40:
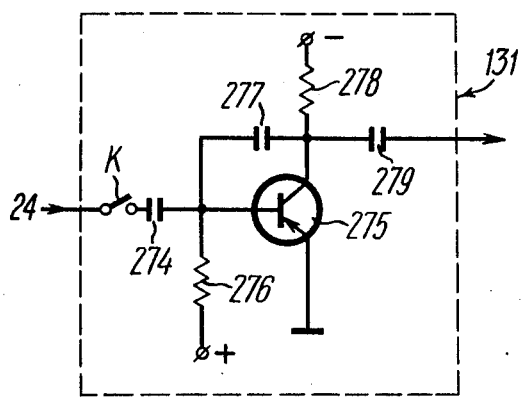
FIG. 40 is an electrical schematic diagram of the control signal detector, according to the invention.

The unit 91 (FIG. 14) for switching the units of the audio-visual teaching machine comprises a switch A for switching on the educational information unit 2 (FIG. 1), switches C, D, E, F, G and H (FIG. 14) for turning on the units 26, 27, 28, 29, 30, and 31 (FIG. 4) of the student's performance control unit 3 (FIG. 1), and a switch K (FIG. 14, FIG. 40) of the student's motor activity control unit 23 (FIG. 3).

Figure 15:
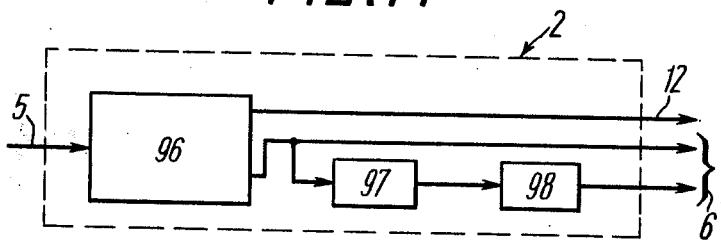
FIG. 15 is a functional diagram of the educational information unit, according to the invention.

The educational information unit 2 (FIG. 15) comprises a tape recorder 96 the output of which is connected to a projector control signal filter 97. The output of the filter 97 is connected to the input of a visual teaching signal projector 98.

The input of the tape recorder 96 is the input 5 of the educational information unit 2; the output of the tape recorder 96 and the output of the projector 98 are combined to form the output 6 of the unit 2.

Figure 16:
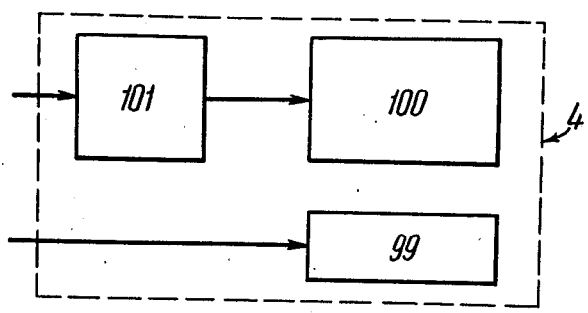
FIG. 16 is a functional diagram of the audio-visual display unit, according to the invention.

The audio-visual display unit 4 (FIG. 16) comprises an educational information visual display unit 99 and an acoustic system 100 with a mixer 101 at the input thereof.

The student's answer registering unit 9 (FIG. 1) comprises a button transmitter 102 the output of which is connected to a pulse shaper 103. The output of the pulse shaper 103 is the output 11 of the answer registering unit 9.

Figure 18:
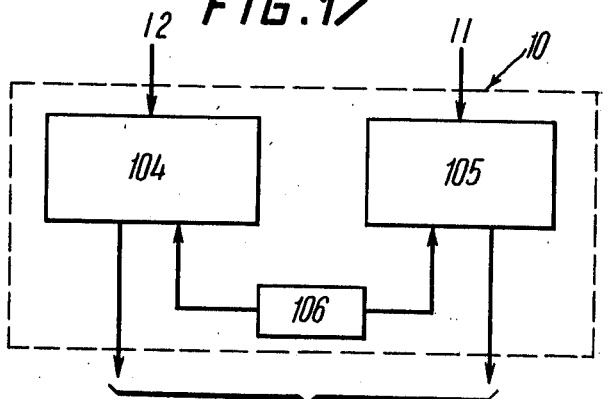
FIG. 18 is a structural diagram of the comparator unit, according to the invention.

The comparator unit 10 (FIG. 18) comprises a counter 104 for counting the reference number of the student's answers, a student's answer counter unit 105, and a counter reset circuit 106 for resetting the counters to zero. The output of the counter 104 and the output of the counter 105 are integrated to form the output 13 of the comparator unit 10.

Figure 19:
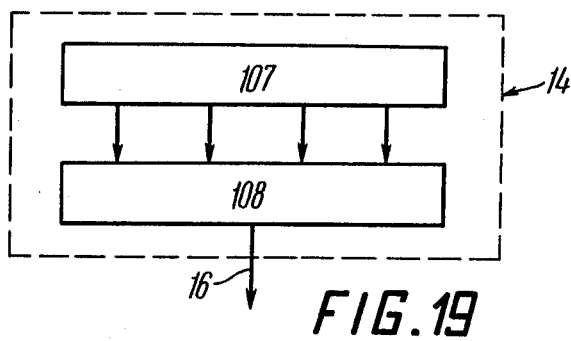
FIG. 19 is a functional diagram of the student's response registering unit, according to the invention.

The response registering unit 14 (FIG. 19) comprises a unit 107 of button pulse transmitters and a connector 108 with the input thereof connected to the outputs of the unit 107.

Figure 20:
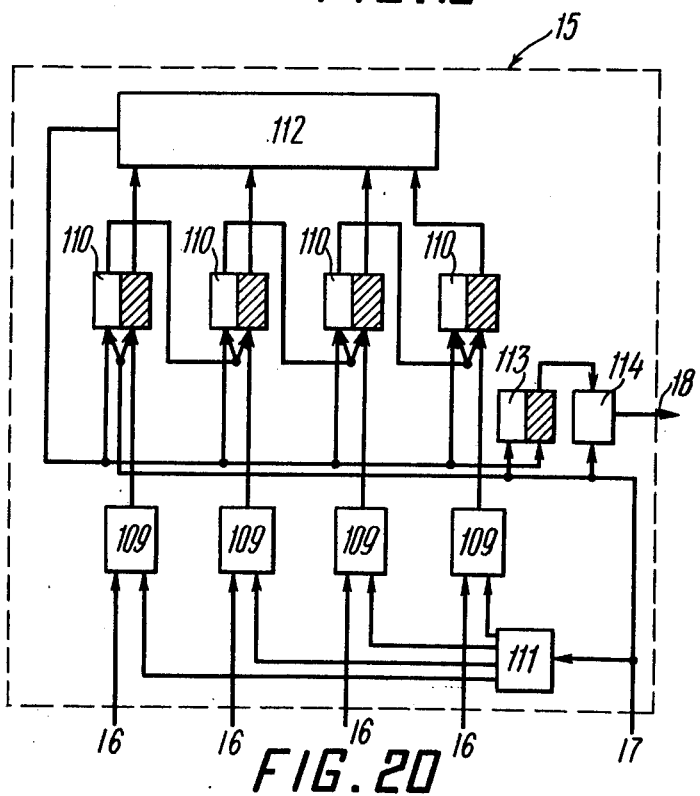
FIG. 20 is a functional diagram of the student's condition checking unit, according to the invention.

The student's condition checking unit 15 (FIG. 20) comprises AND gates 109, flip-flops 110, an enabling pulse switch 111, a decoder 112, a flip-flop 113, and an AND gate 114. The flip-flops 110 are connected in series and form a binary pulse counter. The count input of the first flip-flop 110 is one input of the unit 15. The output of the flip-flop 113 is connected to the AND gate 114; the output of the AND gate 114 is the output 18 of the unit 15. The set inputs of the flip-flops 110 are connected respectively to the outputs of the AND gates 109 which have their first inputs connected to the output 16 of the unit 14, and second inputs connected to the output of the switch 111 with the input thereof connected to the output 17 of the unit 3. The outputs of the flip-flops are connected to the inputs of the decoder 112; the output of which is connected to the set inputs of the flip-flops 110 and the flip-flop 113. The other input of the AND gate 14 is connected to the output 17 of the unit 3.

The exterior stimulus producing unit 30 (FIG. 21) comprises a tape recorder 115 with a random number generator 116 connected to the input thereof.

Figure 22:
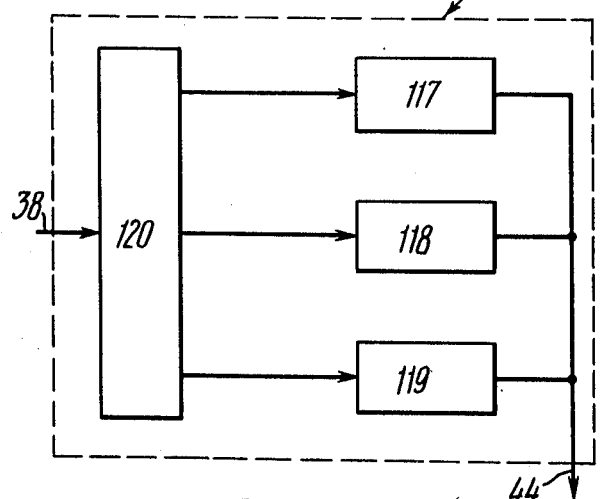
FIG. 22 is a functional diagram of the functional scene unit, according to the invention.

The functional scene unit 31 (FIG. 22) comprises a normal scene unit 117, a stimulating scene unit 118, and an inhibitory scene unit 119, the inputs of the units being connected in parallel to the output of a channel selector 120 and the outputs being connected the output 44 of the functional scene unit 31.

The biostimulation unit 19 (FIG. 23) comprises a conduction asymmetry estimator unit 121, a second indicator 122, a level corrector unit 123, a level control unit 124, a pulse generator 125, and a bidirectional pulse shaper 126. The units 121, 122, 123, 124 and 126 are connected in series, and the output of the unit 125 is connected to the second input of the unit 124. The input of the unit 121 is the input 21 of the unit 19, and output of the unit 126 is the output 22 of the unit 19.

Figure 24:
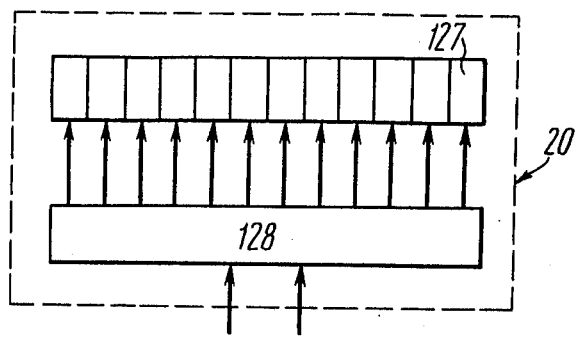
FIG. 24 is a structural diagram of the electrodes assembly, according to the invention.

The electrode assembly 20 (FIG. 24) comprises electrodes 127 the inputs of which are connected to a switch 128 with the combined inputs thereof serving as the inputs of the unit 20.

Figure 25:
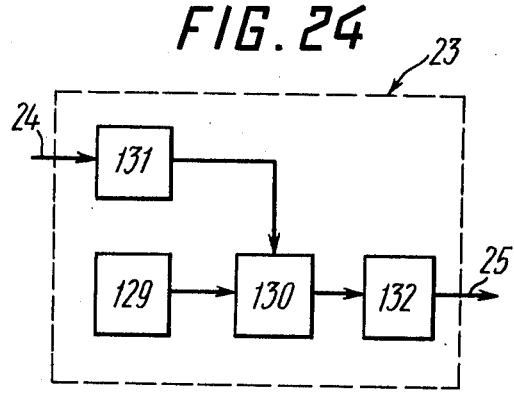
FIG. 25 is a functional diagram of the motor activity control unit, according to the invention.

FIG. 25 illustrates a functional diagram of the student's motor activity control unit 23. A pulse generator 129 is connected with one input of a modulator 130, the other input being connected with the output of a control signal detector 131, the input of the detector 131 being the input 24 of the unit 23. The output of the modulator 130 is connected to a power amplifier 132 whose output serves as the output 25 of the unit 23.

The face panel of the central console 45 (FIG. 26) bears the numbers of the teaching classes, namely: I - class 46, II - class 49, III - class 52, IV - class 55, V -class 58, VI -class 61, VII - class 64 and VIII - class 67, and comprises a "normal program speed" indication unit 133, a "higher program speed" indication unit 134, a "lower program speed" indication unit 135, an intercom unit 136, and an on/off toggle switch 137.

Figure 27:
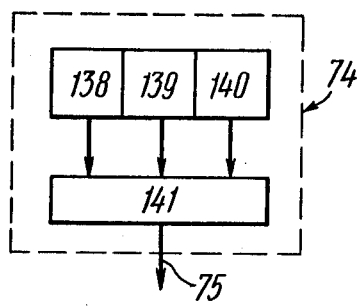
FIG. 27 is a structural diagram of the assembly of biotransmitters, according to the invention.

The biotransmitters assembly 74 (FIG. 27) has electroencephalogram recording electrodes 138, electrocardiogram recording electrodes 139, and student's respiration recording electrodes 140, the outputs of the electrodes being connected to a connector 141.

Figure 28:
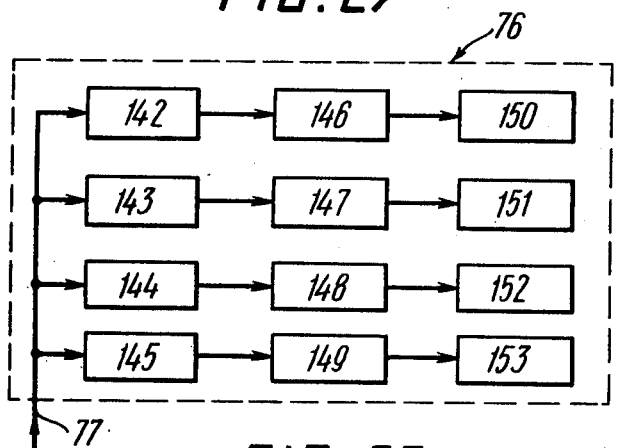
FIG. 28 is a structural diagram of the reflex reinforcement unit, according to the invention.

The reflex reinforcement unit 76 (FIG. 28) comprises control signal filters 142, 143, 144 and 145 with their outputs connected respectively to the inputs of actuator connection circuits 146, 147, 148 and 149, a heater 150, a fan 151, light sources 152, and an audio generator 153. The input of the heater 150 is connected to the output of the circuit 146, the input of the fan 151 is connected to the output of the circuit 147 the input of the light sources 152 is connected to the output of the circuit 148, and the input of the audio generator 153 is connected to the output of the circuit 149.

The timing device 78 (FIG. 29) comprises a time relay 154, a discharge circuit 155, and a light indicator 156. The output of the time relay 154 is connected to one input of the discharge circuit 155 whose output is connected to the light indicator 156. The other input 80 of the discharge circuit 155 is connected to the output 11 of the response registering unit 9.

Figure 30:
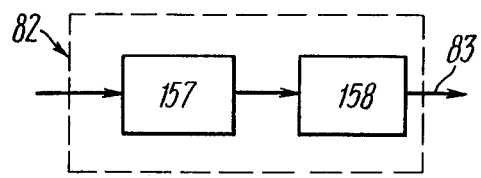
FIG. 30 is a functional diagram of the timer, according to the invention.

The timer 82 (FIG. 30) comprises an amplifier unit 157 and a shaper unit 158. The input of the unit 157 acts as the input of the unit 82 and the output of the unit 157 is connected to the input of the unit 158 the output of which acts as the output 83 of the unit 82.

The quasi-natural light stimulation unit 86 (FIG. 31) comprises an illumination control unit 159 and a light source unit 160. The input of the unit 159 is the input 87 of the unit 86 and the output of the unit 159 is connected to the input of the light source unit 160.

The graded physical load unit 88 (FIG. 32) comprises a load unit 161, a counter unit 162, and a switch 163. The outputs of the load unit 161 are connected in parallel to the inputs of the counter unit 162 whose outputs are connected to the switch 163 whose output is the output 89 of the unit 88.

Figure 4:
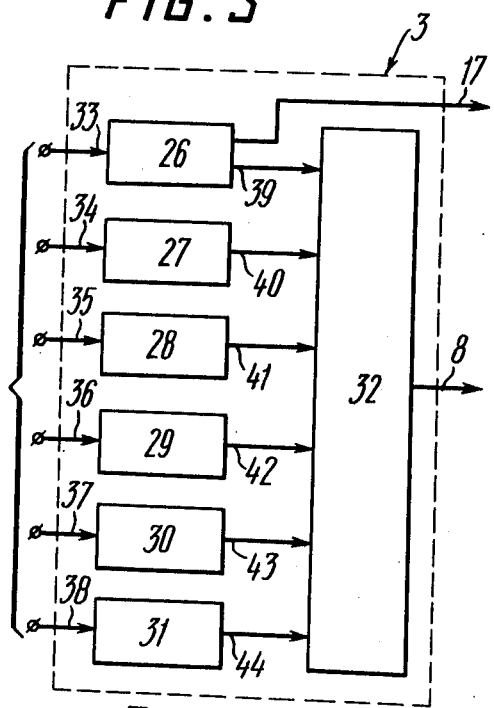
FIG. 4 is a functional diagram of the student's performance control unit, according to the present invention.
Figure 33:
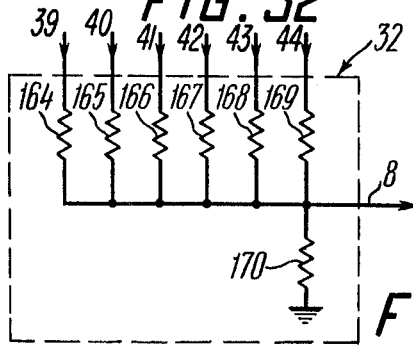
FIG. 33 is an electrical schematic diagram of the adder, according to the invention.

The adder 32 (FIG. 33) comprises resistors 164, 165, 166, 167, 168, 169 and 170. One lead of the resistor 164 is connected to the output 39 of the unit 26 (FIG. 4), one lead of the resistor 165 (FIG. 33) is connected to the output 40 of the unit 27 (FIG. 4), one lead of the resistor 166 (FIG. 33) is connected to the output 41 of the unit 28 (FIG. 4), one lead of the resistor 167 (FIG. 33) is connected to the output 42 of the unit 29 (FIG. 4) and one lead of the resistor 168 (FIG. 33) is connected to the output 43 of the unit 30 (FIG. 4), one lead of the resistor 169 (FIG. 33) is connected to the output 44 of the unit 31 (FIG. 4). The other leads of the resistors 164, 165, 166, 167, 168 and 169 (FIG. 33) are interconnected and are connected to one lead of the resistor 170 which is the output 8 of the adder 32, the other lead of the resistor 170 being grounded.

Figure 21:
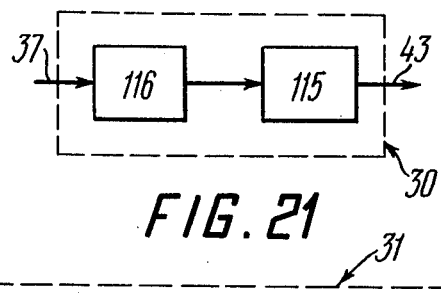
FIG. 21 is a functional diagram of the exterior stimulus producing unit, according to the invention.
Figure 34:
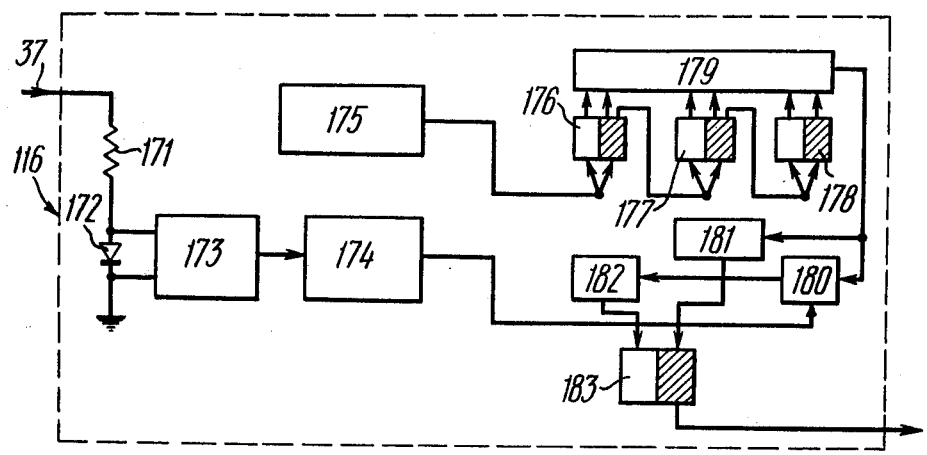
FIG. 34 is a functional diagram of the random number generator, according to the invention.

The random number generator 116 (FIG. 34) comprises a resistor 171 with one lead acting as an input of the exterior stimulus producing unit 30 (FIG. 21), and the other lead being connected to the anode of a diode 172 (FIG. 34) whose cathode is grounded. The diode 172 is connected in parallel with the input of an audio-frequency amplifier 173, the output thereof being connected to an input of a Schmitt flip-flop 174. An output of a clock frequency generator 175 is connected to inputs of a flip-flop 176. Flip-flops 176, 177 and 178 are interconnected to form a three-digit binary pulse counter. The outputs of flip-flops 176, 177, and 178 are connected to a pulse decoder 179, the output of which is connected to one input of an AND gate 180 and to a differentiating circuit 181. The other input of the AND gate 180 is connected to an output of the Schmitt flip-flop 174. The output of the AND gate 180 is connected to a differentiating circuit 182. The outputs of the differentiating circuits 181 and 182 are connected to the inputs of a flip-flop 183, the output thereof serving as an output of the random number generator 116 (FIG. 21).

Figure 35:
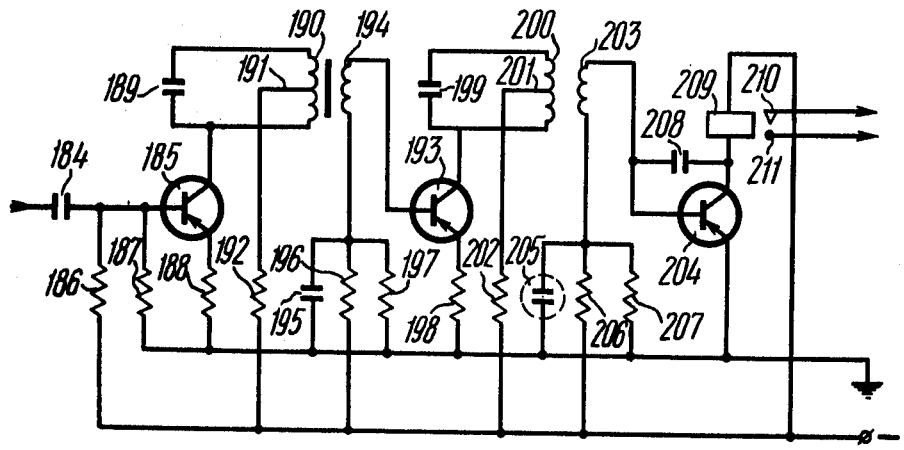
FIG. 35 is a schematic diagram of one section of the projector control signal filter, according to the invention.

The filter 97 (FIG. 15) for signals controlling the projector 98 consists of several sections. FIG. 35 shows an electrical schematic diagram of one section of the filter 87 for controlling the projector 98.

At the input of the filter section there is a capacitor 184 connected to the base of a transistor 185. The base of the transistor 185 is also connected one lead of a resistor 186, whose other lead is connected to the negative pole of a power source (in this and other drawings supply sources are not shown), and to one lead of a resistor 187, whose other lead is grounded. The emitter circuit of the transistor 185 comprises a resistor 188 with its other lead grounded. The collector circuit of the transistor 185 comprises an oscillatory circuit composed of a capacitor 189 and an inductor 190 with a lead 191 connected through a resistor 192 to the negative pole of the same power source.

The base circuit of a transistor 193 comprises a step-down winding 194 the other end of which is grounded through a capacitor 195.

A voltage divider, which is composed of a resistor 196 connected to the negative pole of the power source and a grounded resistor 197, is connected to the junction point of the winding 194 and the capacitor 195.

The emitter circuit of the transistor 193 comprises a grounded resistor 198. The collector circuit of the transistor 193 also comprises an oscillatory circuit composed of a capacitor 199 and an inductor 200 with a lead 201 connected through a resistor 202 to the negative pole of the supply source. A step-down winding 203 is connected to the base circuit of a transistor 204, the other end of the winding being grounded through a capacitor 205. The grounded end also connects to a voltage divider consisting of a resistor 206, connected with the negative pole of the supply source, and a grounded resistor 207. The emitter of the transistor 204 is grounded, and a smoothing capacitor 208 is connected across the base and collector. The collector circuit comprises a relay 209 with a contact 210 and a contact 211, the output of the relay serving as an output of the filter section.

Figure 36:
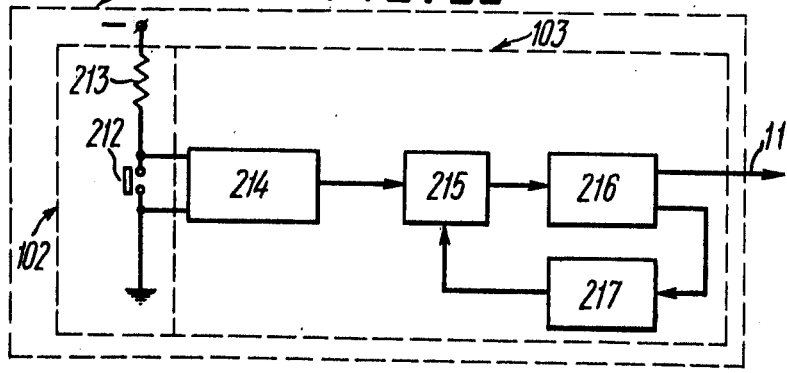
FIG. 36 is an electrical functional diagram of the answer registering unit, according to the invention.

FIG. 36 shows a functional diagram of the answer registering unit 9.

Figure 17:
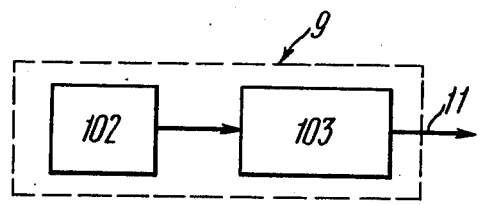
FIG. 17 is a structural diagram of the student's answer registering unit, according to the invention.

A button transmitter 102 (FIG. 36) comprises a button 212 in which one lead is grounded and the other is connected via a resistor 213 to the negative pole of the supply source. The button 212 is connected to an input of the pulse shaper 103 which comprises a Schmitt flip-flop 214. The output of the Schmitt flip-flop is connected to one input of an AND gate 215 whose output is connected to an input of a monovibrator 216 with one output thereof connected with an inverter 217 connected to the other input of the AND gate 215. The other output of the monovibrator 216 is the output 11 (FIG. 17) of the answer registering unit 9.

Figure 23:
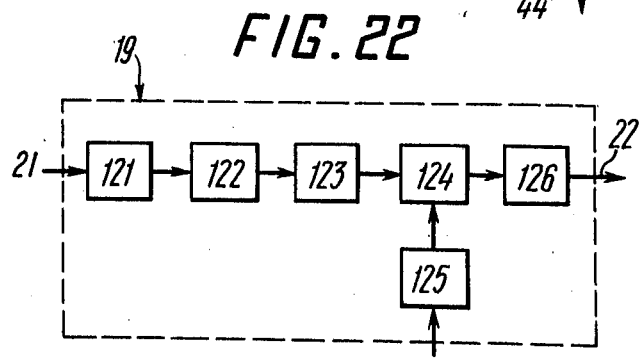
FIG. 23 is a functional diagram of the biostimulation unit, according to the invention.

The biostimulation unit 19 (FIG. 37) comprises a button switch 218 which has three contacts a, b and c and acts as the input 21 of the biostimulation unit 19 (FIG. 23), an active contact 219 and a passive contact 220 which are combined to form the output 22 of the biostimulation unit 19 (FIG. 23).

The conduction asymmetry estimator unit 121 (FIG. 23) comprises transformers 221 and 222 (FIG. 37), detectors 223 and 224, a resistor 225 and, capacitors 226 and 227. The cathode of the diode 23 is connected to one terminal of the secondary winding of the transformer 221, and the anode of the diode 213 is connected to one terminal of the primary winding of the transformer 222. The anode of the diode 224 is connected to the other terminal of the secondary winding of the transformer 221, and the cathode of the diode 224 is connected to the other terminal of the primary winding of the transformer 222. The secondary winding of the transformer 221 has a tap 228 which is connected to the positive pole of the supply source. The primary winding of the transformer 222 has a tap 229 which is connected through a capacitor 227 to the positive pole of the supply source. One terminal of the primary winding of the transformer 221 is the passive contact 220, the other terminal is connected through the capacitor 226 to the positive pole of the supply source and through the resistor 225 to the tap 229.

The sound indicator 122 (FIG. 23) comprises transistors 230 and 231 (FIG. 37), resistors 232 and 233, a transformer 234, and a loudspeaking 235. The terminals of the secondary winding of the transformer 222 are connected respectively to the bases of the transistors 230 and 231, and a tap 236 is connected to resistors 232 and 233. The emitters of the transistors 230 and 231 and also the resistor 233 are connected to the positive pole of a supply source.

The collectors of the transistors 230 and 231 are connected to different terminals of the primary winding of the transformer 234 which has a tap 237 connected to the resistor 232 and to the negative pole of a supply source through a button switch 238. The secondary winding of the transformer 234 has an additional tap 239 which is connected to a loudspeaker 235, and one terminal of the secondary winding of the transformer 234 is connected to the loudspeaker 235 and is grounded.

The level corrector unit 123 (FIG. 23) comprises a resistor 240 (FIG. 37), diodes 241 and 242, and a capacitor 243. One lead of the resistor 240 is connected to the other terminal of the secondary winding of the transformer 234, the other lead of the resistor 240 is connected to the positive pole of the supply source, and its tap 244 is connected to the anode of the diode 241 and to the cathode of the diode 242. The anode of the diode 242 is connected to a positive pole of the supply source. The cathode of the diode 241 is connected to a capacitor 243 which is connected to the positive pole of the supply source.

The level control unit 124 (FIG. 23) comprises a transistor 245 (FIG. 37), resistors 246, 247, 248 and 249, and a capacitor 250. The leads of the resistors 246 and 248 are connected via the switch 238 to the negative pole of the supply source, and their other leads are connected, respectively, to the base and to the collector of the transistor 245. One lead of the resistor 247 is connected to the capacitor 243, and the other lead of the resistor 247 is connected to the base of the transistor 245. One lead of the resistor 249 is connected to the emitter of the transistor 245, and the other lead of the resistor 249 is connected to the positive pole of the supply source. The collector of the transistor 245 is connected through a capacitor 250 to the active contact 219.

The pulse generator 125 (FIG. 23) comprises transistors 251 and 252 (FIG. 37), resistors 253, 254, 255, and 256 and capacitors 257, 258, 259 connected to form a multivibrator.

Figure 37:
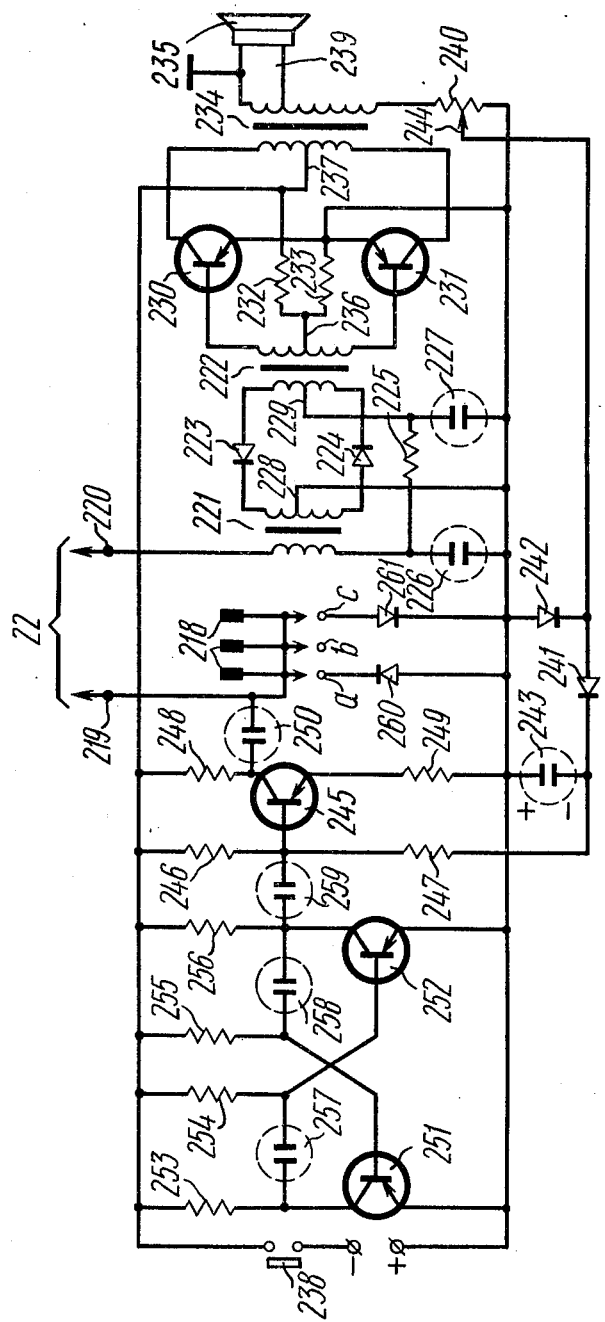
FIG. 37 is an electrical schematic diagram of the biostimulation unit, according to the invention.

The biderectional pulse shaper unit 126 (FIG. 23) comprises diodes 260 and 261 (FIG. 37). The anode of the diode 260 and the cathode of the diode 261 are connected to the positive pole of the supply source. The cathode of the diode 260 is connected to the contact a, and the anode of the diode 261 is connected to the contact c.

Figure 38:
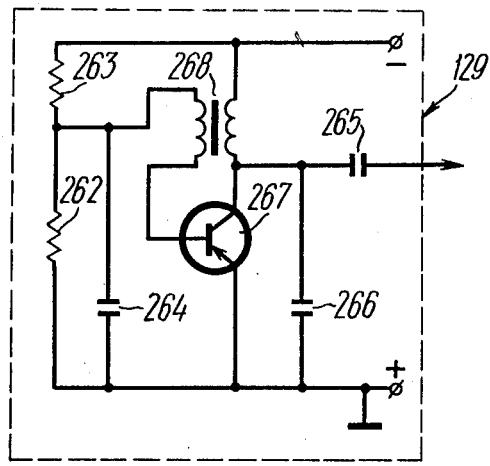
FIG. 38 is an electrical schematic diagram of the pulse generator, according to the invention.
Figure 39:
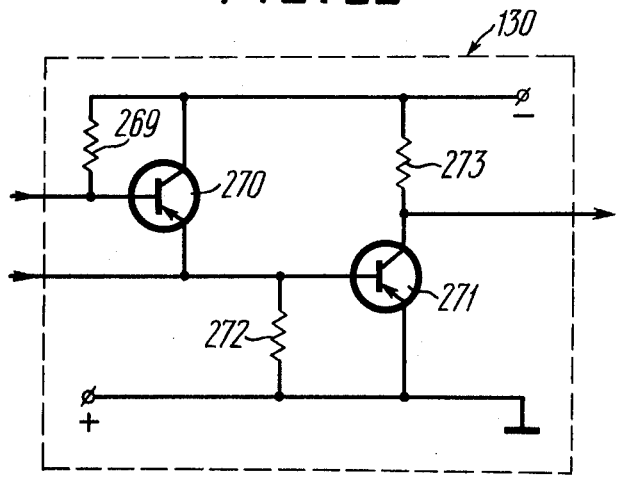
FIG. 39 is an electrical schematic diagram of the modulator, according to the invention.
Figure 41:
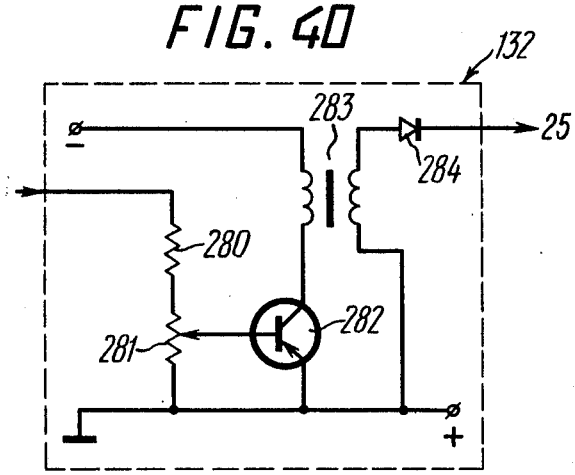
FIG. 41 is an electrical schematic diagram of the power amplifier, according to the invention.

The motor activity control unit 23 (FIG. 25) comprises a generator 129 (FIG. 38), a modulator 130 (FIG. 39), a detector 131 (FIG. 40), and an amplifier 132 (FIG. 41).

The generator 139 (FIG. 38) comprises resistors 262 and 263, capacitors 264, 265, 266, a transistor 267, and a transformer 268. The resistors 262 and 263 are connected in series, and their junction point is connected to the primary winding of the transformer 268 and to one lead of the capacitor 264 the other lead of which is grounded. The other leads of the resistors 262 and 263 are connected, respectively, to the positive and to the negative poles of the supply source. The other terminal of the primary winding of the transformer 268 is connected to the base of the transistor 267, the emitter being grounded and the collector being connected to one terminal of the secondary winding of the transformer 268, the other terminal being connected to the negative pole of the supply source. The collector of the transistor 267 is also connected to one lead of the capacitor 265 and to one lead of the capacitor 266. The other lead of the capacitor 265 is an output of the generator 129; the other lead of the capacitor 266 is grounded.

The modulator 230 (FIG. 39) comprises a resistor 269 connected across the base of a transistor 270 and the negative pole of the supply source. The collector of the transistor 270 is connected to the negative pole of the supply source, and the emitter of the transistor 270 is connected to the base of a transistor 271 which has a resistor 272 connected between its base and its emitter, the emitter of the transistor 271 being grounded. The collector of the transistor 271 is connected through a resistor 273 to the negative pole of the supply source.

The detector 131 (FIG. 40) comprises a switch K connected to a capacitor 274, one lead of which is an input of the detector 131 and the other lead is connected to the base of a transistor 275 and to a resistor 276, the other lead to the resistor 276 being connected to the positive pole of the supply source. A capacitor 277 is connected across the base and the collector of the transistor 275, and the emitter of the transistor 275 is grounded. The collector of the transistor 275 is connected through a resistor 278 to the negative pole of the supply source and to one lead of a capacitor 279, the other lead of which is the output of the detector 131.

The power amplifier 132 (FIG. 41) comprises a resistor 280 placed in series with a variable resistor 281 with one lead grounded and the midtap connected to the base of a transistor 282 with the emitter grounded and the collector connected to the primary winding of a transformer 283. The other terminal of the primary winding of the transformer 283 is connected to the negative pole of the supply source. One terminal of the secondary winding is grounded and the other is connected to the anode of a diode 284 whose cathode is the output of the amplifier 132.

Figure 42:
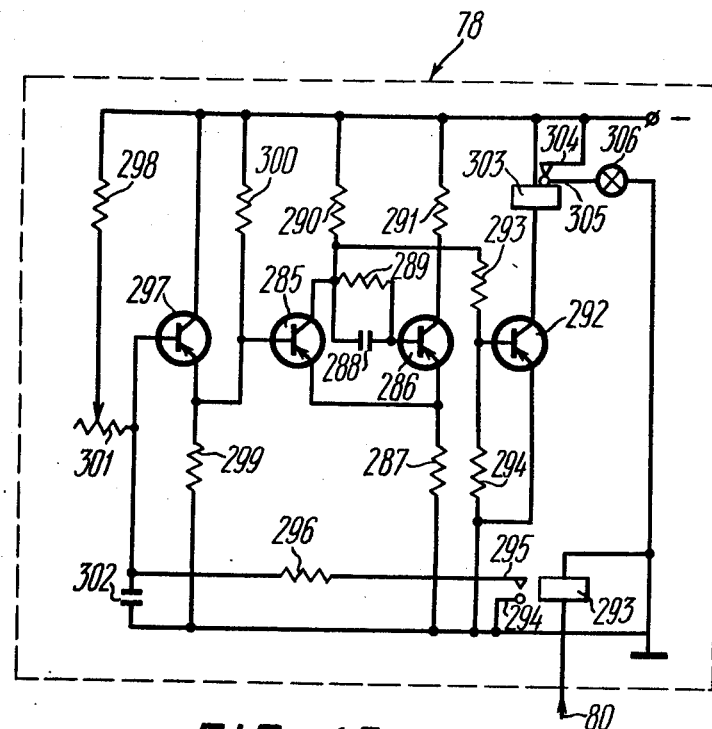
FIG. 42 is an electrical schematic diagram of the timing device, according to the invention.

The time relay 154 (FIG. 29) comprises a Schmitt flip-flop having a transistor 285 (FIG. 42) and a transistor 286, a feedback resistor 287, a resistor 289 in parallel with a capacitor 288 which are connected between the collector of the transistor 285 and the base of the transistor 286, resistors 290 and 291, and also a power amplifier composed of a transistor 292 and resistors 293 and 294. The emitters of the transistors 285 and 286 are grounded through the resistor 287, and their collectors are connected to the negative pole of the supply source through the resistors 290 and 291, respectively. The collector of the transistor 285 is connected to one lead of a resistor 293 with the other lead thereof connected to the base of the transistor 292, the base beng connected to ground through a resistor 294. The emitter of the transistor 292 is grounded.

The discharge circuit 155 (FIG. 29) comprises a relay 293 (FIG. 42) with one terminal acting as the input 80 (FIG. 29) and the other terminal being grounded, a contact 294 (FIG. 42) which is also grounded, and a contact 295 connected to one lead of a resistor 296. The discharge circuit 155 also comprises a transistor 297, resistors 298, 299 and 300, a variable resistor 301, and a capacitor 302. The emitter of the transistor 297 is connected to the base of the transistor 285 and to the resistor 299, the other lead of which is grounded; the collector is connected to the negative pole of the supply source; the base is connected to the variable resistor 301, the midtap of which is connected through the resistor 298 to the negative pole of the supply source. One lead of the capacitor 302 is grounded, and the other lead is connected to the base of the transistor 297 and to the other lead of the resistor 296.

The light indicator 156 (FIG. 29) comprises a relay 303 (FIG. 42), one terminal being connected to the collector of the transistor 292 and the other terminal and a contact 304 being connected to the negative pole of the supply source, and a contact 305 connected to one lead of a lamp 306 with the other lead thereof grounded.

Figure 43:
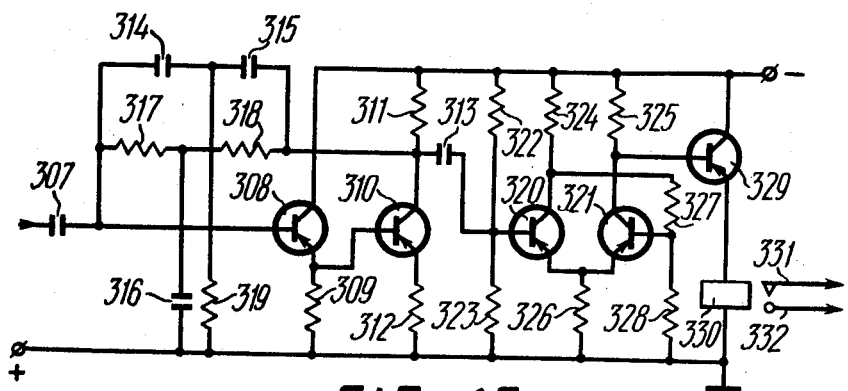
FIG. 43 is an electrical schematic diagram of one section of the timer, according to the invention.

The amplifier 157 (FIG. 30) comprises an input capacitor 307 (FIG. 43), an emitter follower composed of a transistor 308 and a resistor 309, an amplifier circuit which has a com mon emitter with a transistor 310, resistors 311 and 312 and an output capacitor 313, and an RC-filter composed of resistors 317, 318, 319 and capacitors 314, 315, 316. One lead of the capacitor 307 is the input of the timer 82 (FIG. 30) and the other lead is connected to the base of the transistor 308 (FIG. 43), in which the emitter is connected to the base of the transistor 310 and the collector is connected with the negative pole of the supply source. The emitters of the transistors 308 and 310 are grounded through the resistors 309 and 312, respectively. The collector of the transistor 310 is connected through the resistor 311 to the negative pole of the supply source. The RC-filter with its resistor 319 and capacitor 316 grounded is connected across the base of the transistor 308 and the collector of the transistor 310. One lead of the resistor 318 is connected to the collector of the transistor 310 and the other lead is connected to one lead of the capacitor 316 and to one lead of the resistor 317, the other lead of which is connected to the base of the transistor 308.

One lead of the capacitor 315 is connected to the collector of the transistor 310 and the other lead is connected to one lead of the resistor 319 and to one lead of the capacitor 314, the other lead of which is connected to the base of the transistor 308.

The shaper 158 (FIG. 30) comprises a Schmitt flip-flop composed of transistors 320 and 321 (FIG. 43) and resistors 322, 323, 324, 325, 326, 327 and 328; a transistor 329; and a relay 330 with contacts 331 and 332. Connected to the base of the transistor 320 are one lead of the resistor 322, the other lead thereof being connected to the negative pole of the supply source, one lead of the resistor 323, the other lead thereof being grounded, and one lead of the capacitor 313. Connected to the collector of the transistor 320 are one lead of the resistor 324, the other lead thereof being connected to the negative pole of the supply source, and one lead of the resistor 327, the other lead thereof being connected to the base of the transistor 321 and to one lead of the resistor 328 with the other lead thereof grounded. The emitters of the transistors 320 and 321 are interconnected and their common junction is connected to one lead of the resistor 326 the other lead of which is grounded. The collector of the transistor 321 is connected to one lead of the resistor 325 with the other lead thereof being connected to the negative pole of the supply source and to the base of the transistor 329 with the collector connected to the negative pole of the supply source and the emitter connected to one lead of the relay 330, the other lead of which is grounded. The contacts 331 and 332 are the ouput 83 (FIG. 30) of the timer 82.

The graded physical load unit 161 (FIG. 32) comprises a transformer 333, the secondary winding of which incorporates a solenoid 334 with an armature 335, and a slider 336.

The audio-visual teaching machine for speedy training and the instruction center as the basis thereof are intended for teaching various theoretical subject matters, professional motor skills and also foreign languages. The present invention makes it possible to learn typing, rapid reading, short hand, exact sciences and humanities without a teacher in 3 to 10 days; a foreign language can be learned in from 2 to 6 weeks. The students graduating from such courses are able to read and translate non-adapted texts, including fiction, political texts and professional publications in one's field, to speak a foreign language and to acquire a certain command of writing. The use of the present invention stimulates the student's condition and performance and enhances his imagination.

The main operating principle of the machine and the instruction center is as follows. Prior to the speedy instruction cycle, educational information audio and visual messages, functional scene signals paced with the human biological processes, tests and instructions, exterior stimuli, programed self-training signals, educational information delayed reinforcement signals and suggestive and subsensory performance stimulation signals are pre-recorded on a storage medium. These signals are then converted into records to be used for sessions of passive assimilation of lesson material, sessions intended for bringing memorized material into active use, relaxation sessons, programed self-training sessions, programed sleep sessions, sessions of presenting educational information at the rate of the student's main biological processes, the student's performance stimulation sessions, proficiency checking sessions, sensory-motor training sessions and testing sessions.

The teaching process includes playing-back of various pre-recorded session programs which may alternate and repeat in the course of teaching, the sequence of alternation and repetition of the sessions being determined by the student's psychophysiological characteristics. In addition, the alternation or repetition pattern of presenting educational information may change in the course of the teaching process depending on the student's results and condition.

The main sessions in the suggesto-cybernetic teaching process are the following:

a testing session during which psychophysiological audio and video tests and self-training messages are presented to the student and the student's responses to these stimuli are registered, electrically active points on the student's body are stimulated and the biological processes of said student are registered, and the results of the registered responses and biological processes are used for evaluation of the student's psychophysiological characteristics whereupon special tests in the subject matter to be studied are offered for the student's consideration and a general educational information presentation pattern for this particular student is outlined on the basis of the tests data;

a session of passive assimilation of educational information when basic and supplementary tutorial information and instructions are presented to the student;

a session of bringing memorized lesson material into active use during which educational information is presented in the form of queries and tasks for sensory perception, whereas the key verbal messages and the verbal answer signals are conveyed at the subsensory level;

a performance stimulation session when the student is presented programed self-training signals as well as suggestive and subsensory control signals for controlling his psychophysiological condition together with reflex reinforcment intended to enhance the student's performance, and when electrically active points of the student's body are stimulated;

a proficiency checking session when only basic lesson material messages without supplementary educational information and without key signals are presented to the student with simultaneous registration of the student's answers;

a session of presenting lesson material at the rate of the student's biological processes when educational information signals are synchronized with one of the basic biological processes of said student, for instance, the respiratory rate, the dominant electroencephalogram frequency, or the pulse rate;

a sensory-motor training session during which educational information is presented to the student in suggestive form which stimulates the student's motor activity simultaneously with electric stimulation of the appropriate student's muscles;

a relaxation session when only self-training messages are presented to the student;

a programmed sleep session during which suggestive and subsensory signals are applied which promote effective passive rest; and an active rest session when control signals intended for restoring the student's performance are presented and are supplemented by functional music, entertainment films and application of graded physical load.

Thus, the method of playing back and presenting information messages for speedy suggesto-cybernetic teaching using the proposed teaching machine and the instruction center consists of the steps of pre-recorded session signals, including educational information messages and the student's condition control signals, being presented to the student in specially equipped classrooms, the student's answers and responses being immediately registered with a view to monitoring the student's condition, and controlling his performance and altering the educational information programs in response to the student's progress and condition. In this case, the class for testing and checking the student's condition conducts testing sessions for evaluating the student's psychophysiological characteristics and perception features prior to starting the teaching process, so as to decide on the teaching program pattern and on to what group of students (in case of group teaching) this particular student should be assigned by taking into account his individual learning ability; in the class for stimulating the student's performance and suggestive control of his condition, performance stimulation sessions are conducted before starting the daily teaching lesson and also, when this becomes necessary, between teaching sessions in the course of the tutorial process; the class of passive assimilation of lesson material conducts sessions of passive assimilation of educational information; in the class of bringing memorized material into active use the students are urged to bring passively acquired lesson material into active use and their proficiency in checked; the class of presenting informative material at the rate of the student's biological processes involves sessions whereby educational material presented to the student is paced with his biological processes; in the class of sensory-motor instruction, sessions of teaching professional motor skills are conducted, for example, teaching typing, operator's manipulations, teleprinter operations, etc.; the relaxation and programed sleep class holds relaxation sessions in the course of teaching or after the end of the lessons, as well as controlled day sleep sessions and controlled night sleep sessions in the case of the student's round-the-clock stay in the instruction center; and the programed rest class sessions of active rest periods are conducted in intervals between the teaching sessions.

The lesson advance (i.e. the sequence of session presentation and the required number of reviews for various portions of educational material) is controlled and altered in response to the student's progress evaluated in terms of comparison of the number of his answers to a predetermined amount of lesson material.

On the basis of the results of the student's responses to test signals in the course of teaching sessions, his peformance can be controlled by presenting him suggestive and subsensory control signals and stimulating or inhibitory scene programs.

The speedy foreign language teaching program is compiled so that requisite sessions of the above kinds are presented to the students for about 7–8 hours a day.

To enable presentation of required program sessions, the students are put in specially equipped classrooms. The student's workplaces in the classrooms are essentially armchairs with built-in electrodes and transmitters. In the course of each session audio and visual educational information messages are presented to the student and his answers and responses are registered.

In the course of the teaching process the students are moved from one classroom to another so that various instruction sessons can be presented to them. If the session presentation program must be corrected, the composition of the group of students may be changed. The instruction center may be used for simultaneous teaching of several groups of students with different sessions according to their planned time-table.

Educational information is a combination of audio and visual signals. The audio component of the educational information contains verbal messages of the basic lesson material and additional informative data and instructions. In the course of teaching foreign language, lesson material comprises additionally oral translation of foreign speech. The video component may be a printed text (with parallel translation for foreign language courses), figures, symbols, strip films or movies.

Tests are made for suggestivity, attention level, visual perception and auditory threshold levels.

Exterior stimuli are emotionally significant audio signals which restore the student's subsiding orientation response.

Normal scene signals contain music at 60–80 beats per minute (heart rate), 12–18 beats per minute (respiratory rate) 10–30 Hz (encephalogram).

Stimulating scene signals contain music at 80–120 beats per minute, 15–25 beats per minute and 15–30 Hz.

Inhibitory scene signals contain music at 40 60 beats per minute, 8–15 beats per minute and 2–10 Hz.

Below is given the description of the audio-visual teaching machine, the instruction center as the basis thereof and the speedy teaching technique.

For practical application of the suggesto-cybernetic speedy teaching method and of the teaching machine, preparation of information for the teaching process and of the system of presenting educational information to the students are based on the following principles:

the student's condition and performance are controlled in the course of the teaching process;

the form of presenting educational information signals is optimized for improving the efficiency of the teaching course;

prior to the start of the teaching course the students are tested with respect to their basic psychophysiological characteristics wwith a view towards assembling them into groups of students with similar psychophysiological parameters;

conventional textbooks and other material may be used as initial educational programs, the initial educational information signals being converted for teaching purposes into a special form of a composite audio-visual signal;

a psychologically stimulating situation is created which is conducive to a more effective use of the student's potentialities; and the most advanced and effective of the existing teaching techniques and procedures are generalized to give a qualitatively new effect.

Each of the above principles is implemented through a number of factors. Below are listed the basic factors which promote the success of the suggesto-cybernetic teaching method.

The student's condition is controlled as follows.

verbal messages of suggestive and subsensory control are composed;

suggestive control verbal messages pre-recorded on a medium are played for the student;

functional music signals at the rate of the student's optimum biological processes are played back for the student in the course of teaching sessions;

automatic means are used for presenting programmed self-training verbal signals to the student;

the student's condition is adjusted as required by playing suggestive control verbal signals;

suggestive stimulation signals are formed depending on the students' responses at the testing sessions;

the effectiveness of the student's condition control is checked by means of transmitters that detect his responses to the test signals;

the student's condition is adjusted to a required level by stimulating electrically active points on his body;

suggestive and subsensory control signals are presented at the rate of the student's basic biological processes, i.e. respiration, blood circulation and cerebral biocurrents;

a reference number of the student's answers and responses is preset;

correcting signals are presented in accordance with different answers and responses of the students;

the student's condition control program is altered depending on the results of the tests registered by a response transmitter;

subsensory control signals are used for adjusting the student's condition as required;

the effectiveness of suggestive control is checked by registering the student's responses and answers;

the working pace is imposed on the student by using quasi-natural light stimulation; and suggestive control verbal signals are used to induce a change in the pace of the student's biological processes under the action of functional scene signals.

Optimization of the form in which lesson material is presented to the student is achieved as follows:

audio-visual educational signals are presented in the form of a composite signal;

audio-visual educational signals are presented in the form of a multi-channel parallel signal;

suggestive stimulation sessions are used for controlling suggestivity of the student;

educational information is presented in the form of emotional-semantic units, such as, scenes, studies, songs, or tables.

suggestive control verbal signals are reinforced by video and aural psychological illusions;

multiple associations are created for educational formation signals by means of video and aural signals;

educational information is presented at a certain preset rate;

session programs are prepared so as to enable time-distributed passive reflux memorizing of the education material of the entire course by the students;

at teaching sessions educational information signals are alternated with testing signals;

educational information signals are presented at the rate of the student's main biological processes;

a student-to-machine dialogue is programmed by presenting queries and tasks that stimulate the answers;

emotional-semantic modulation of educational information signals is used;

passive assimilation sessions are used in the teaching course;

sessions for bringing memorized material into active use are conducted;

relaxation sessions are conducted;

sessions of presenting information at the rate of the student's biological processes are conducted;

sensory-motor training sessions are conducted;

suggestively controlled sleep sessions are conducted;

sessions of programed active rest with a graded physical load are conducted;

biostimulation sessions are conducted;

key verbal signals are conveyed into the students' earphones, while task and queri signals are played through the loudspeaker;

educational information signals are presented in the form of subsensory control signals;

video information is presented at the rate of cerebral biocurrents;

larger amounts of information are presented in the same time period by changing the speed at which aural and video signals are presented;

the optic channel is used for subconscious detection of visual signals;

suggestive control messages are compiled with due account for psychological complexity of their realization (from simple to complex messages);

educational verbal signals in foreign languages are presented with simultaneous interpretation;

verbal signals are used for programming scenes and exercises in a foreign language;

sessions of questions asked in a foreign language with programmed answers are conducted;

verbal instructions of the educational course, verbal messages of suggestive and subsensory signals and verbal psychophysiological and linguistic tests are prepared so as to achieve the maximum effect of teaching;

the rate of presenting educational information is selected depending on the results of the proficiency tests and on the speed of the student's response;

in the foreign language teaching course, verbal educational signals are played additionally with a one-sintagm delay at the conscious perception level;

at teaching sessions pre-recorded verbal instruction signals are played back in the form of suggestive control messages;

delayed potential reinforcement of suggestive control messages by physical stimuli is used;

perception abilities are used to reinforce suggestive control verbal signals by feelings and sensations based on these perception abilities;

the level of subsensory control signals is selected in accordance with the student's conscious perception threshold on the basis of 50% of answers in response to the signals presented;

in the course of teaching sessions educational information units presented to the student are checked; and at teaching sessions the student's proficiency is checked at the recognition, reproduction, and generation levels.

A physchologically stimulating teaching situation is provided by the following factors:

verbal suggestive control messages orient the student to reflex memorizing of the educational material;

a psychologically stimulating situation of a non-completed action is programmed;

in the course of teaching sessions the characteristics of presented aural and video signals are varied with a view to maintaining the student's orientation response;

information signals are alternated with exterior stimuli for maintaining the student's non-subsiding orientation response;

presentation of education material is integral (i.e. covers the scope of a standard textbook);

presentation of lesson material is distributed between different teaching sessions;

teaching sessions are alternated with suggestively controlled sleep sessions;

subsensory stimulation of a programmed answer is used;

verbal signals and situational factors are conducive to an unconstrained behavior during the teaching process;

programmed variation of intonation is used when offering the student aural and video signals;

the intensive teaching method is used (up to eight hours of lessons per day);

teaching is conducted by means of an automatic machine without a teacher;

all conveniences are provided for the student in the course of teaching;

when presenting multi-level parallel signals, the student's attention is switched over by means of verbal instructions and of the teaching situation;

the students study is acoustically equipped and easthetically finished booths;

the student's workplace is a chair with a high tilting back and built-in transmitters;

an educational cycle program is selected from a library of programs recorded in the course of a test teaching course for a control student with similar answers to the test signals;

suggestive stimulation of the student's condition and perception processes is effected by reinforcing the suggestive message with audio and visual psychological illusions associated with the contents of the verbal messages;

programmed self-training is used;

the answers of the students are registered taking into account the student's response speed regardless of whether the answer is formally correct;

teaching sessions are conducted so that one teaching session is held between sleep sessions;

at sessions for bringing memorized material into active use the students bring into active use the material they have passively assimilated at the previous sessions;

the students are shown documentary suggestive movies about the results of teaching the previous groups of students;

when presenting information the number of the student's responses and anwers is compared with the reference number of responses and answers;

at passive assimilation sessions the students are presented educational information in the amounts exceeding the amounts of information that can be assimilated during one lesson using traditional methods;

when teaching a foreign language, the educational program contains a vocabulary that enables the student to read and translate non-adapted texts of an average complexity, professional publications in his field and political texts, and the student acquires an active vocabulary sufficient to speak on basic topics and a certain command of writing in the foreign language;

suggestive messages promote an increased speed of reading texts;

a physical load is graded at programmed rest sessions;

an audio-visual presentation of educational material is achieved by offering video signals on several screens and playing back aural signals through several channels;

a suggestive program of raising the speed of motor performance is presented;

a suggestive program of enhancing the student's imagination is presented;

delayed reinforcement (reminiscence) sessions are included in the teaching course;

a delayed material assimilation session is included in the teaching course;

an optimum microclimate is provided in the teaching room;

suggestive stimulation is supplemented by electric stimulation of the electrically active points of the student's body;

suggestive stimulation is used in combination with myostimulation of the student's muscles;

the time deficit situation is programmed and used;

the optimum nutrition and rest conditions are provided for the students;

at teaching and programmed rest sessions; colour music is used for playing musical scene signals;

a leader student trained by suggestive methods is included in the group of students;

the advantages of this method are emphasized by suggestive methods;

in the teaching course active responsiveness states are alternated with sleep/rest sessions;

novelty of a teaching situation and of the interior are used for maintaining the non-subsiding orientation response of the student;

self-estimation of assimilation, understanding and memorizing translated into motor performance is used;

when teaching a foreign language, pronunciation is taught on the principle of imitation with reinforcement;

exterior stimuli and reflex reinforcement signals are selected depending on the student's responses to these signals;

quasi-natural light stimulation is used in the teaching center with a view to stimulating the student's performance;

the time of the student's answer is set by a light stimulator;

for preparing the student for the teaching course he is instructed in self-training prior to the teaching cycle;

at suggestively-controlled sleep/rest sessions the student is presented suggestive messages aimed at enhancing his pneumonic abilities and reminiscence;

suggestive verbal messages are accompanied by reinforcing emotionally significant noise signals associated with the contents of the suggestive messages;

suggestive verbal messages predict the subjective feelings of the progress in assimilating the educational material of the entire teaching course;

cyclic changes in the student's performance are taken into account for scheduling the teaching course; and the teaching process is controlled by an operator. Preliminary testing and selection of students are provided as follows:

the dynamics and efficiency of the test teaching course are checked;

the degree of readiness of the students for self-training is estimated;

the frequencies of the student's main biological processes (respiration, pulse rate, electroencephalogram) are measured;

the response of the student to electric stimuli applied to his electrically active points is measured;

the speed of the student's verbal and motor responses is studied;

the conscious perception level of the student is measured;

involuntary motions of the student are registered;

the student's electroencephalogram is taken;

suggestivity of the student is studied;

the student's ability to receive suggestive and subsensory signals is investigated;

the student's response to signals controlling his perception orientation by suggestive verbal messages is studied;

musical compositions that cause positive emotional responses in the students are selected;

the students are assembled into groups according to the principles of community of interests and subjects for communication;

groups of students are formed according to the principles of similar characteristics, answers and responses to the tests in the students of one group; and the psychological compatibility of students in one group is studied.

The optimum features and procedures of the existing teaching techniques are generalized as follows:

a teaching course in a particular subject matter is conducted without a teacher;

relaxation before teaching sessions is used;

educational information is presented in information units on the principle of adaptive branching programs;

during the last days of the teaching course the students hear and speak only the foreign language they study;

fully automated facilities are provided for the student to master a foreign language;

the psychotherapeutic principle of suggestive control in the state of relaxation is used;

teaching materials of audio-visual courses in the form of video signals and phonographic records are employed;

teaching materials of traditional courses are employed;

teaching materials of suggestopedic courses are employed;

teaching materials of audio-lingual courses are employed;

the tachistoscopic method of presenting video information is used;

the methods of suggestopedic teaching are used; the principles of using educational materials of a higher complexity are used.

The modification and preliminary preparation of teaching programs for speedy training are ensured by a system of information conversion for speedy teaching and are accomplished by means of a respective teaching machine.

Below is given the description of operation of the proposed teaching machine which accomplished the speedy teaching method in accordance with the above principles.

The operator's console 1 (FIG. 1) delivers a signal initiating the student's performance control unit 3, the self-training signals start coming from the self-training unit 27 (FIG. 4) through the adder 32 to the audio-visual display unit 4 (FIG. 1).

The adder 32 (FIG. 33) operates as follows. Signals from the outputs 39, 40, 41, 42, 43, and 44 of the units 26, 27, 28, 29, 30 and 31, respectively, are applied to the resistors 164, 165, 166, 167, 168 and 169. Voltage dividers are formed between the resistor 170 and each of the resistors 164, 165, 166, 167, 168 and 169 for each of the input signals, respectively. Thus the resistor 170 will produce a signal which is the sum of signals proportional to each input signal.

The signal from the output 8 of the adder 32 goes to the unit 4, where visual display device 99 (FIG. 16) reproduces video signals, while the acoustic system 100 plays back aural signals.

After self-training has been terminated, psychophysiological test signals start coming from the tests unit 26 (FIG. 4) to the unit 4 (FIG. 1). The student is instructed to push the specific button transmitters 107 (FIG. 19) corresponding to each particular test, and signals from the transmitters are applied through the connector 108 to the student's condition checking unit 15 (FIG. 1). At the same time service scan signals come from the unit 3 to the other input of the unit 15. The inputs of the AND gates 109 (FIG. 20) receive signals from the unit 14, whereas the input of the switch 111, the count input of the first flip-flop 110- flip-flop 113 and the AND gate 114 receive read signals from the unit 3. Since signals from the unit 14 are applied at different time instants, only one of the AND gates 109 is operable at each moment depending on the setting of the switch 111, therefore, the signal may be applied only to one respective flip-flop 110. After completion of the sequence of the tests a scan signal comes from the condition control unit 3 to the count input of the first flip-flop 110, and the flip-flop counter starts counting pulses delivered from the AND gates 109, while the decoder 112 generates a pulse when all the flip-flops are set to 1. The output signal of the decoder 112 interlocks the flip-flops 110 and resets them to 0, and a train of pulses is applied from the output of the AND gate 114 to the student's condition indicator unit 95 (FIG. 14) of the operator's console 1. Then, a control teaching period is initiated: a signal sent from the operator's console 1 (FIG. 1) energizes the educational information unit 2, the tape recorder 96 (FIG. 15) of the unit is switched on and starts playing back audio lesson messages and service signals which go through the filter 97 to the projector 98 and cause it to produce video images of the educational information.

The service signal filter 97 (FIG. 15) is composed of several sections, each tuned to a frequency of one of the service signals: 1000, 3000, 5000, 7000 or 10,000 Hz.

Consider operation of one section of the service signal filter 97 (FIG. 35).

The output signal of the tape recorder 96 (FIG. 15) is delivered through the capacitor 184 (FIG. 35) to the base of the transistor 185. The D.C. voltage of the transistor 185 is set by a divider composed of the resistors 186 and 187. Negative voltage is applied to the resistor 186. By varying the magnitudes of the resistors 186 and 187, a requisite operating point of the transistor 185 is selected for linear amplification of the incoming signals. The resistor 188 serves to stabilize D.C. voltage of the transistor 185 and to increase its input resistance. To decrease the shunting effect introduced by the output resistance of the transistor 185 into the oscillatory circuit (capacitor 189 and inductor 190), the inductor 190 is connected only partially by means of the tap 191 which receives negative voltage through the resistor 192. The oscillatory circuit is tuned to the fundamental frequency of the detected audio signal, for example, 1000, 3000, 5000, 7000 and 10,000 Hz. For matching the output resistance of the transistor 185 with the input resistance of the subsequent stage built around the transistor 193, the step-down winding 194 is included in the base circuit of the transistor 193. A signal is applied to the base of the transistor 193 from one terminal of the winding 194.

The divider composed of the resistors 196 and 197 stabilizes the operating point of the transistor 193 which ensures linear amplification of the incoming signals. The resistor 198 raises the input resistance of the transistor 193 and stabilizes its D.C. voltage. The collector circuit of the transistor 193 incorporates an oscillatory circuit which has the tap 201 from the inductor 200 which receives the collector supply voltage of the transistor 193 through the resistor 202. The oscillatory circuit composed of the inductor 200 and the capacitor 199 is also tuned to the fundamental frequency of the input signal. The operating mode of the transistor 204 which passes only signals of one polarity is determined by the ratio of the magnitudes of the resistors 206 and 207. As the input signal is applied, the collector circuit of the transistor 204 passes current with a D.C. component which causes the relay 209 to close its contacts 210 and 211.

Educational information video and aural signals are delivered to the audio-visual display unit 4 (FIG. 1) and are presented to the student. In the course of teaching the student is instructed to push the button transmitter 102 (FIG. 17) and the shaper 103 generates a pulse signal each time the transmitter 102 is pushed.

The answer registering unit 9 (FIG. 36) operates as follows. Negative voltage is applied from the supply source through the resistor 213 to the contacts of the button 212. As the button 212 closes, a pulse is delivered to the input of the Schmitt flip-flop 214, and the flip-flop converts the pulse with sloping edges into a steep-edge pulse. The output signal of the Schmitt flop-flop 214 goes to the AND gate 215. From the output of the AND gate 215, the pulse is delivered to the monovibrator 216 which converts this signal into a pulse of a preset length. The AND gate 215 operates in the absence of a signal at the output of the monovibrator 216. Thus a trigger signal is applied from the output of the AND gate 215 to the monovibrator 216. As the monovibrator 216 operates, its output signal goes through the inverter 217 to the AND gate 215 and cuts off the gate. When cut off, the gate 215 blocks all the subsequent signals from the Schmitt flip-flop 214 until the monovibrator 216 is switched off. In this way, a depression of the button causes generation of an output signal of a preset length with steep edges at the output 11 (FIG. 17) of the pulse shaper 103.

This pulse is delivered to the student's answer counter unit 105 (FIG. 18) of the comparator unit 10. Simultaneously, the counter 104 for the reference number of answers receives from the unit 2 prerecorded pulses whose number is a reference for evaluating the student's progress in assimilating a given portion of educational information.

The operator evaluates the student's state of knowledge by the reading of the indicator 93 (FIG. 14) which displays the reference number of answers and of the counter unit 94. On the basis of the student's responses to the tests presented and his progress the operator grades the student, i.e. selects a teaching program for this particular student or assigns him to an appropriate group of students (in group teaching). After that the teaching process starts. As was described above, a signal from the operator's console 1 (FIG. 1) energizes the educational information unit 2 and the audio-visual display unit 4 displays lesson material for the student's consideration. At the same time, functional scene signals from the functional scene unit 31 (FIG. 4) are applied through the student's condition control unit 3 to the unit 4. In addition, for maintaining the orientation response of the student, exterior stimuli start coming randomly from the unit 30. These signals are reproduced by the tape recorder 115 (FIG. 21) which is actuated by the random number generator 116 (FIG. 21) and are applied to the unit 4 (FIG. 1).

The random number generator 116 (FIG. 34) is intended for producing a random signal for switching on the tape recorder 115 (FIG. 21). The generator 116 (FIG. 34) operates as follows. Negative voltage applied to the input 37 is delivered through the resistor 171 to the diode 172 and sets up noise voltage across the diode 172. This noise signal is applied to the input of the audio-frequency amplifier 173 having a high gain (about 5000). The amplifier 173 has a passband from 50 Hz to 10,000 Hz. From the output of the audio-frequency amplifier 173, noise voltage goes to the Schmitt flip-flop 174. The Schmitt flip-flop effects clipping/limiting of the noise signal and converts it into pulses of a random length. These pulses are applied to the AND gate 180. Simultaneously, the clock frequency generator 175 produces pulses at a frequency of 10 pulses a minute which go to the flip-flop pulse counter. The output signals of the flip-flop 176 are applied to the count input of the flip-flop 177, and therefrom to the count input of the flip-flop 178. The output signals of the flip-flops 176, 177 and 178 are applied to the pulse decoder 179 which detects each eighth pulse. From the output of the decoder 179, the pulses go to the AND gate 180. If the output signal of the decoder 179 and the output signal of the Schmitt flip-flop 174 are time-coincident, a pulse is sent from the output of the AND gate 180 to the differentiating circuit 182. The output signal of the differentiating circuit 182 goes to the set input of the flip-flop 183. At the same time, the output signal of the decoder 179 is applied to the differentiating circuit 181 the output signal of which is delivered to the other set input of the flip-flop 183. Thus, flipping of the flip-flop 183 is random and depends on coincidence of the output pulses from the decoder 179 and the Schmitt flip-flop 174. The output signal is taken off one of the branches of the flip-flop 183.

In the course of teaching presentation of educational information is interrupted in response to a signal from the operator's console 1 and the tests program is delivered from the unit 3. At the same time, the student's responses are registered by the response registering unit 14 as shown above. If the student's condition remains at the original level, presentation of educational information continues. If the characteristics of the student's condition are found to deviate from the initial level, subsensory signals from the unit 29 (FIG. 4) are delivered to the student simultaneously with educational material and the nature of the functional scene signals is varied. The normal scene unit 117 is switched off by means of the channel selector 120 (FIG. 22) of the functional scene unit 31, and the stimulating scene unit 118 or the inhibitory scene unit 119 is actuated by the same channel selector.

After some time the student is again tested. If there is still a deviation in the student's condition from his initial condition, the subsensory signal producing unit 29 (FIG. 4) is cut off and the suggestive signal producing unit 28 is actuated, the suggestive signals being presented to the student together with instructional information and functional scene signals.

In case the deviations in the student's condition persist as shown by a sequence of tests, the educational information unit 2 (FIG. 1) is switched off and the self-training unit 27 is actuated. The self-training section continues until the student's performance is completely restored.

In addition, in the course of teaching the student's answers to educational information signals are registered by the answer registering unit 9 (FIG. 1) and are compared with the reference number of answers in the comparator unit 10, so that thereafter the operator can evaluate the student's answers and can continue or alter the predetermined course of teaching.

The biostimulation unit 19 (FIG. 2) is employed for expanding the range of the student's condition control. Prior to starting the lessons, electrically active points are found on the student's body and the electrodes 127 (FIG. 24) are attached to these points. Pulses generated by the biostimulation unit 19 (FIG. 23) are applied to the electrodes 127 through the switch 128. The generator 125 produces pulses which are transmitted through the level control unit 124 and the bidirectional pulse shaper 126 to the assembly 20 of electrodes (FIG.

2). The pulses arriving at the asymmetry estimator unit 121 (FIG. 23) come to the sound indicator 122 and therefrom are passed along a feedback circuit to the level control unit 123 which keeps the magnitude of current constant regardless of the resistance of the student's body tissues. The switch 128 (FIG. 24) connects the electrodes one by one to the biostimulation unit 19 (FIG. 2).

The biostimulation unit 19 (FIG. 37) operates as follows. First, electrically active points on the student's body are determined. For this purpose, the active contact 219 and the passive contact 220 are connected to the electrodes assembly 20 (FIG. 24) so that the passive contact is connected with one electrode 127, which is fixed stationary to the student's body at an electrically neutral point, and the active contact 219 is connected with another electrode 127, which is movable over the surface of the student's body. As the switch 238 is turned on, supply voltage is delivered to the pulse generator 125 and the pulse generator starts generating pulses. The switch 218 turns on the contact b. In this position, the unit 126 is not adjusted to any special level and A.C. pulse current is passed through the student's body. The pulses are delivered through the passive contact 220 to the primary winding of the transformer 221 of the conduction asymmetry estimator unit 121 and further through the secondary winding of the transformer 222 to the sound indicator 122. The human body has a resistance of about 1 MOhm. At an electrically active point this resistance drops to 50–100 kOhm. In this case the magnitude of current passing through the circuit increases abruptly and the loudspeaker 235 produces the tone of the fundamental frequency which depends on the capacitance of the capacitors 257 and 258. If the point is "anomalous," its conductance will be different for pulses of different polarity. In this case, an additional tone (second harmonic of the fundamental frequency) will be produced in the loudspeaker 235.

After the electrically active points have been found, the electrodes 127 are attached at these points to the student's body. In the biostimulation mode, the contact a or the contact c is actuated depending on what action is required. The variable resistor 240 is fitted with a calibration scale which is used for setting a required stimulation current before the stimulation session. In the course of operation of the biostimulation unit 19, pulses are applied through the feedback circuit via the resistor 240 to the level correction unit 123 and then, via the resistor 247, to the level control unit 124. The current magnitude at the output of the unit 124 remains constant due to a change in the bias voltage at the base of the transistor 245.

Figure 2:
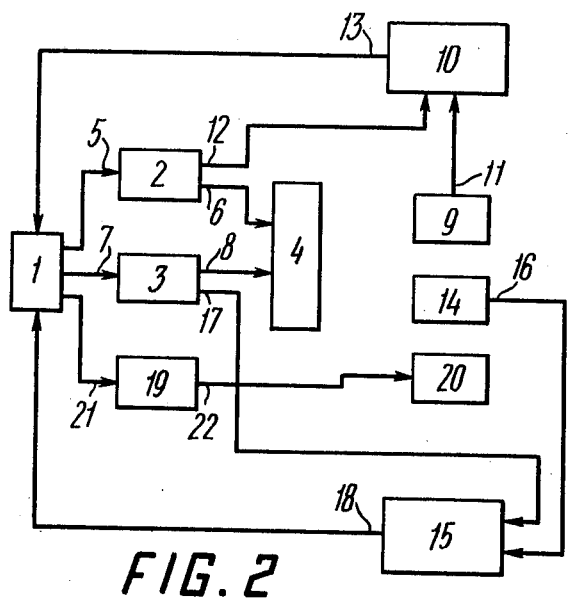
FIG. 2 is a block diagram of the audio-visual teaching machine for speedy training with a biostimulation unit embodying the present invention.

If the tests detect, as was shown above, deviations in the student's condition from his initial level, the operator may, depending on the nature of the deviation, switch on the biostimulation unit 19 (FIG. 2).

The student's motor activity control unit 23 (FIG. 3) is used to enhance the efficiency of teaching professional motor skills. The student's motor activity control unit 23 (FIG. 25) is intended for electrical stimulation of the student's muscles and fostering his motor performance. The pulse generator 129 generates square pulses at a 80-Hz frequency which are applied to the input of the modulator 130. Control signals from the output of the educational information unit 2 are sent to the input 24 of the unit 23 (FIG. 3). The detector 131 (FIG. 25) detects these signals, and the outputs of the detector 131 are applied to the input of the modulator 130 which modulates the train of pulses generated by the generator 129. The modulated output signals of the modulator 130 pass to the power amplifier 132 which effects final amplification of the pulses. From the amplifier's output, the pulses go the output 25 of the student's motor activity control unit 23, and from the output 25 further to the input of the electrodes assembly 20 (FIG. 3). Prior to starting the teaching cycle, the electrodes 127 (FIG. 24) are fastened to the student's specific muscles depending on the teaching program. In the course of teaching educational information signals are presented to the student and at the same time control signals come to the input 24 of the unit 23. The student's motor activity control unit 23 (FIG. 25) operates as follows. The generator 129 (FIG. 38) generates square pulses at a frequency of 80 Hz with an exponential decay time. The transformer 268 introduces a positive feedback and, as a result, self-sustained pulses appear in the collector circuit of the transistor 267. The resistors 262 and 263 provide required D.C. voltage of the transistor 267. The capacitor 264 determines the frequency of the generated pulses, and the capacitors 265 and 266 provide a required waveform of these pulses.

When the switch K is turned on, biosignals from the output 6 of the educational information unit 2 prerecorded on a medium are applied to the input of the detector 131 which is the input 24 of the unit 23 (FIG. 3) is synchronism with educational information signals.

These signals are delivered through the capacitor 274 (FIG. 40) to the base of the transistor 275 whose operating condition is set by a positive bias applied to its base via the resistor 276. This ensures linear amplification for negative signals only, and detection occurs. The capacitor 277 integrates the detected signals and isolates their envelope. The signal is applied to the output from the resistor 278 via the capacitor 279. The output signal of the detector 131 modulates the sequence of pulses generated by the generator 129. From the output of the generator 129 the pulse goes to the input of the modulator 130 (FIG. 39), namely, to the base of the transistor 271. The output signal of the detector 131 (FIG. 40) comes to the base of the transistor 271.

The D.C. voltage of the transistor 270 (FIG. 39) is set by the resistor 269 the resistance of which is selected such that the gain of the transistor 271 is a minimum if no signal is applied to the base of the transistor 270. The D.C. voltage of the transistor 270 is set by the resistor 272.

When a signal is applied to the base of the transistor 270, the gain of the transistor 271 rises depending on the level of the signal delivered from the detector 131. Thus the output of the modulator 130 produces a train of pulses modulated by the bioprocess envelope which is applied to the input of the power amplifier 132 (FIG. 41). The input voltage is divided by a divider composed of the resistors 280 and 281 and is delivered to the base of the transistor 282 operating into the transformer 283. The secondary winding of this transformer produces an output signal detected by the diode 284. This signal goes to the output 25 (FIG. 3) of the student's motor activity control unit 23. The teaching process occurs as shown above.

Figure 26:
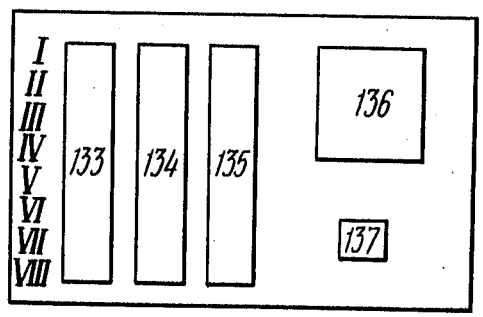
FIG. 26 is a schematic external view of the central console panel, according to the invention.

The instruction center (FIG. 5) is intended for teaching individual students and whole classes various theoretical subjects and professional motor skills. Lesson advance signals are sent from each classroom to the central console 45 (FIG. 26). The presence of the signal at the unit 133 indicates that the lessons in a classroom are progressing normally and in conformity with a predetermined teaching program. The presence of a signal at the unit 134 means that the lessons in the classroom are over. The signal at the unit 135 shows that the classroom will be occupied for some additional period of time. The intercom unit 136 allows communication with the operator's console in each classroom. In the course of the teaching process the students move from one classroom to another as required by planned teaching sessions.

The classrooms operate in the following way.

The classroom 46 (FIG. 6) for student's testing and condition checking is a means for presenting to the student a program of psychophysiological tests which serve to evaluate the student's psychophysiological characteristics so that a teaching program can be selected for this particular student. The equipment of the classroom displays visual test signals and plays back the sound portion of the tests to the student and simultaneously registers his answers and biological responses.

For testing, the student is put at the workplace 71 in the room 70. The student's workplace 71 is a chair with a high tilting back, and with the answer registering unit 9, the response registering unit 14, the electrodes assembly 20 and the assembly 74 of biotransmitters built into the chair.

The biotransmitters assembly 74 (FIG. 27) comprises the electroencephalogram transmitters 138, the electrocardiogram transmitters 139, and the respiration transmitters 140 which are connected through the connector 141 to the multi-parameter recorder 73 (FIG. 6) which is a standard multi-channel encephalograph recording the student's biological responses. The transmitters are fastened on the student's body. The biological processes in the student's organism are first registered before the start of the tests and then his responses and biological processes are registered as audio and visual test signals are presented to him from the audio-visual display unit 4.

When testing starts, the tests unit 26 (FIG. 4) is actuated in response to a command from the operator's console 1. The tests unit 26 is a standard stereophonic tape recorder synchronized with a filmstrip projector. Pre-recorded on a tape medium are verbal signals of psychophysiological tests, response rate tests, tests to determine conscious perception, suggestivity, readiness for self-training and attention level, and tests for checking the student's vision and auditory thresholds. Suggestivity tests are tests for catalepsy, amnesia, visual and auditory hallucination and ideomotor movements. The details of the automatic suggestivity tests are to be found in "Problems of detecting weak nervous responses" edited by prof. D. D. Fedotov with participation of V. V. Petrusinskiy, Cand. Sc. (Biol), Moscow, 1968. The visual portion of the tests coded on a stripfilm consists of symbols and drawings timed with the verbal test messages. The student's responses to the audio and visual tests presented to him are registered by the response registering unit 14 (FIG. 6) and a pulse is applied to the student's condition checking unit 15. Depending on the time interval during which the pulse travels from the response registering unit 14, the student's condition checking unit sends to the operator's console 1 a coded pulse-numerical signal which permits quantitative evaluation of the student's condition. Time intervals are coded by signals played back by the tests unit 26 (FIG. 4). These signals are recorded in the form of pulses on the second track of the stereophonic tape recorder.

The biostimulation unit 19 operates as follows. In response to a command from the operator's console 1 (FIG. 6) negative pulses are applied from the output of the biostimulation unit 19 to the assembly 20 of the electrodes which are fastened to the electrically active points of the student's body. Electric stimulation of the electrically active points of the student's body expands the range of control of his condition, improves the student's performance and permits checking of his responses to a pulse stimulus. The efficiency of biostimulation is also checked by means of the response registering unit 14.

Figure 6:
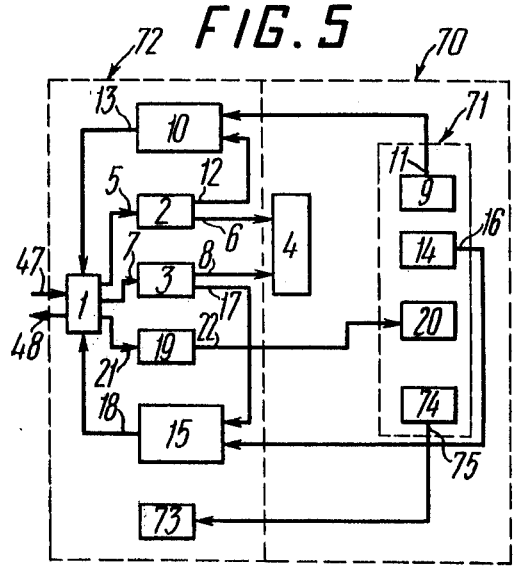
FIG. 6 is a functional diagram of the classroom for testing and checking the student's condition, according to the invention.

The student's condition control unit 3 (FIG. 4) operates as follows. For performance control, the student is presented programmed self-training messages, a program of suggestive signals which are verbal suggestive control messages, subsensory control program which consists of suggestive verbal messages at the student's perception level, functional scene signals and exterior stimuli. Changes in the student's behavior caused by application of the above signals are registered by the response registering unit 14 (FIG. 6). An appropriate instruction sets time intervals during which the student's response is an answer confirming the efficiency of a specific control action. The psychophysiological testing course is followed by a control teaching period aimed at determining the perception characteristics of the student and his learning ability for a particular type of instructional information.

The control teaching program includes the initial part of the information to be assimilated. This program is displayed by the educational information unit 2 and the number of the student's answers is directly registered by the answer registering unit 9. The registered results are transmitted to the operator's console 1. On the basis of the testing and control teaching data, the operator grades the student and, consequently, selects a teaching program to be presented to the student to obtain optimum teaching efficiency.

According to the results of the control teaching period, the students are divided into four main groups. Group I (about 20% of students) shows the best results. Group II (about 40%) shows the average results given in the description. For students of group III (about 20%) the duration of the teaching course must be increased by 1.5–2 times for achieving the average results. Finally, group IV (about 20%) comprises students for which teaching by this method is not effective.

These four main groups are further divided into subgroups in accordance with psychophysiological testing results.

After testing the students may start the learning process either immediately or after any time interval depending on the number of workplaces available in the instruction center.

Students with similar learning abilities and perception parameters may be selected to form a group gradually for some time and start learning as soon as the group is complete. Thus, new students entering the instruction center may be tested independently of the other teaching classes.

Figure 7:
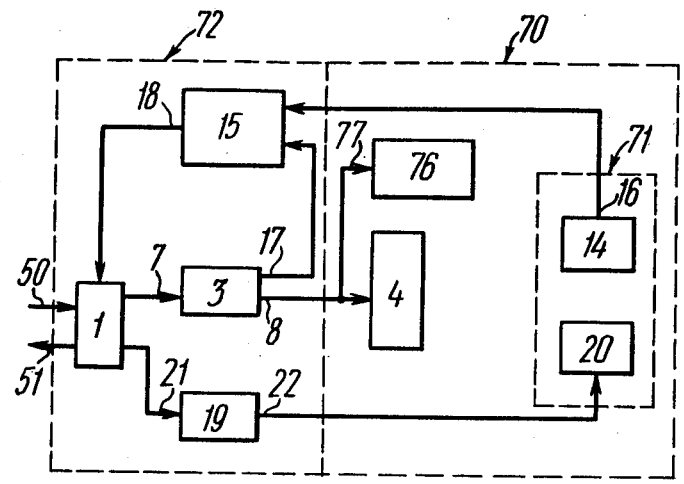
FIG. 7 is a functional diagram of the classroom for stimulating the student's performance and for suggestive control of his condition, according to the invention.
Figure 8:
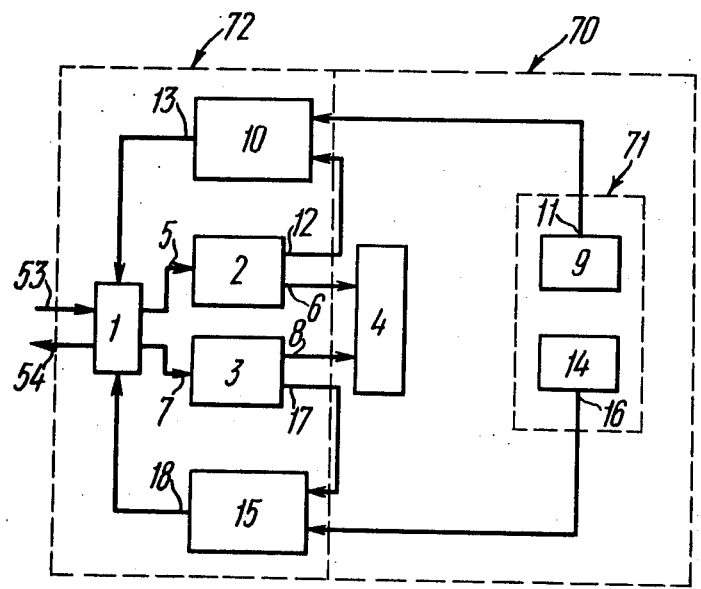
FIG. 8 is a functional diagram of the classroom for passive assimilation of educational information, according to the invention.

The class room 49 (FIG. 7) for stimulation of the student's performance and control of his condition is intended for presenting to the student suggestive and subsensory messages as well as reflux reinforcement signals together with functional scene audio and visual messages. Stimulation sessions are conducted prior to the beginning of the course of teaching and, if necessary, in the course of the teaching process, as well. The student is put in the workplace 71 which is a chair with the built-in response registering unit 14 and the electrodes assembly 20. The audio-visual display unit 4 presents signals from the control unit 3 for the student's consideration. Suggestive verbal and noise signals synchronized with visual images are also played. The suggestive messages presented suggest tasks easy to accomplish. For example, a student trained in hypermnesia (super memory) is asked to memorize a sequence of 200–300 words. In this case memorizing of such a number of words is facilitated by presentation, through visual of, various associative visual patterns, each associated with one of the words in the sequence. Thus, when the student views a pattern, it is easy for him to remember an appropriate word. In addition, memorizing of words is promoted by subsensory reinforcement in the form of the same words reproduced at the student's conscious perception threshold level. These subsensory messages are presented with the aid of both audio and visual signals. In the latter case, subsensory reinforcement is given in the form of words displayed by highly distorted letters against the background of lines, spots and other distracting factors. Memorizing of 200–300 words within a several-minute session creates a favorable psychological situation in the student and makes him confident in the success of the teaching method. A similar suggestive situation is created in rapid reading teaching when the student is presented, through audio and visual signals, blocks of text in which several underlined words convey a general idea of the contents of the paragraph. Such a suggestive step-up improves the rapid reading ability of the student. The suggestive situation can also be created as follows. For example, first a picture showing similar-size patterns is presented to the student. Then, it is asserted that the size of the patterns will be different, and a special scene is built up to develop a visual illusion of changing pattern sizes. Thus, the suggestive messages are reinforced by visual illusions. A still more effective reinforcement of suggestive messages is achieved through the use of the reflex reinforcement unit 76 (FIG. 7).

The reflux reinforcement unit 76 (FIG. 28) comprises the filters 142, 143, 144 and 145 tuned to specific control signals. When a control signal comes from the output 8 of the unit 3 (FIG. 7), one of the actuating devices 146, 147, 148 or, 149 (FIG. 28) operates through a respective filter. For instance, if suggestion is made to the effect that it is becoming warmer in the room, the heater 150 is switched on; if a wind is suggested, the fan 151 is actuated. If the student is suggested that illumination of the room is changing, the light source 152 is turned on; a second suggestion is accompanied by generation of audio signals from the audio generator 153.

The biostimulation unit 19 (FIG. 7) stimulates electrically active points on the student's body and a signal from the biostimulation unit 19 is applied to the assembly 20 of the electrodes built into the student's chair. The electrodes are attached to the student's body. The results of the stimulation are evaluated by the response registering unit 14 which registers the student's response to the suggestive messages presented to him.

The classroom 52 (FIG. 8) for passive assimilation of educational information is designed for presenting synchronized audio and visual messages of instructional material for subconscious assimilation by the students. During a teaching lesson the student sits in the workplace 71 which is a chair with the built-up response registering unit 14 and the answer registering unit 9. Educational information is conveyed in the form of verbal messages of the basic lesson material and supplementary informative data. In foreign language courses the basic lesson material is presented in a respective foreign language, whereas supplementary educational material is simultaneous translation. Visual messages are lesson texts with tables and symbols in the form of printed matter, filmstrips or movies. Visual messages in foreign language courses are parallel tests in two languages. Educational information is presented simultaneously with functional scene signals.

For maintaining the student's non-subsiding orientation response, the parameters of aural information signals i.e., frequency, pitch, volume and intonation, are variable. In addition, said educational information in foreign language courses consists of short independent emotional-semantic blocks, cues, scenes, and exercises. In the first days of teaching instructions are given in the mother tongue with simultaneous translation into a foreign language; in the subsequent days information is presented in a foreign language with simultaneous translation into the student's language; after the fifth day information is present in a foreign language only.

At the beginning and at the end of a session for passive assimilation of lesson material, the student is presented, through the performance control unit 3, programmed self-training signals including relaxation and stimulation programs accompanied by appropriate functional scene signals. The signals are presented at a sensory perception level, and at the same time at the auditory threshold level. After the self-training program has been terminated, the unit 3 presents psychophysiological test signals, the student's responses to which are registered by the response registering unit 14.

The student's answers to the educational information signals are registered by the answer registering unit 9. The outputs of the unit 9 are transmitted to the comparator unit 10. The other input of the unit 10 receives signals delivered from the output 12 of the educational information unit 2. The number of these pulses is equal to the reference number of answers. The results are applied to the operator's console 1. The student's responses to condition control signals are registered by the response registering unit 14. Pulses from the unit 14 are supplied to one input of the student's condition control unit 15, the other input of the unit 15 accepting pulses from the output 17 of the control unit 3 which determine intervals during which the student's response is significant for evaluating the efficiency of his condition control.

The classroom 55 (FIG. 9) for bringing memorized material into active use is intended for presenting to the student audio and visual lesson signals and signals stimulating his verbal skill as well as delayed subsensory correcting and key signals and verbal reinforcement signals. The classroom sessions stimulate the student's verbal performance (when foreign languages are taught).

During the session the student sits in the room 70 at his workplace 71 which is a chair fitted with the built-in response registering unit 14, the answer registering unit 9, and the earphones 79. Individual chairs are separated by removable sound insulation partitions. During the session the students are presented audio and visual signals at the level of sensory (conscious) perception in the form of suggestive educational messages that suggestively stimulate the student's verbal performance. In addition, additional informative data signals are presented (in foreign language courses these signals are conveyed in a respective foreign language). Translation is also given with a time delay equal to the length of an additional information sentence. This is followed by a pause whereupon basic educational information signals are presented in the form of the translation of earlier presented signals of the additional informative data at the subsensory (subconscious) level, i.e. at the student's perception threshold level. These signals are also transmitted to the student's earphones and the student may listen to them when he desires. Thus while listening to a verbal message in his mother tongue, the student immediately translates the message orally into a foreign language and after that may listen to a correct version of translation into a foreign language at the perception threshold level. For measuring the answer time (time of the student's verbal response), the timing device 78 is enabled. The timing device 78 is the time relay 154 (FIG. 29) with light indication. The student must give an answer before the light indicator 156 comes on.

Figure 9:
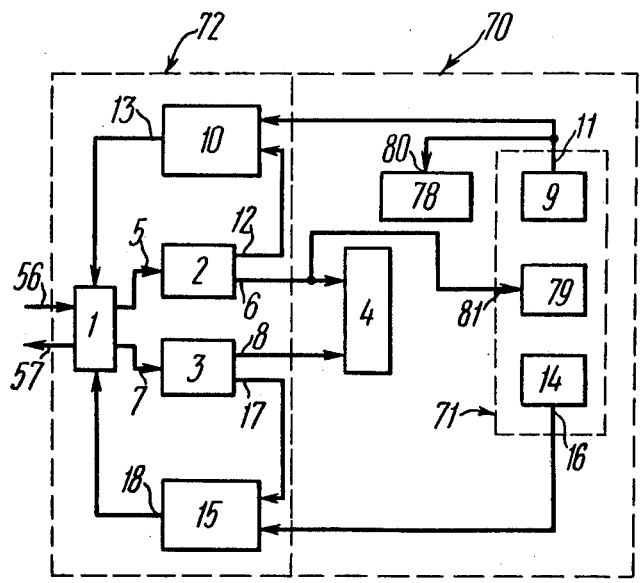
FIG. 9 is a functional diagram of the classroom for bringing memorized material into active use, according to the invention.
Figure 10:
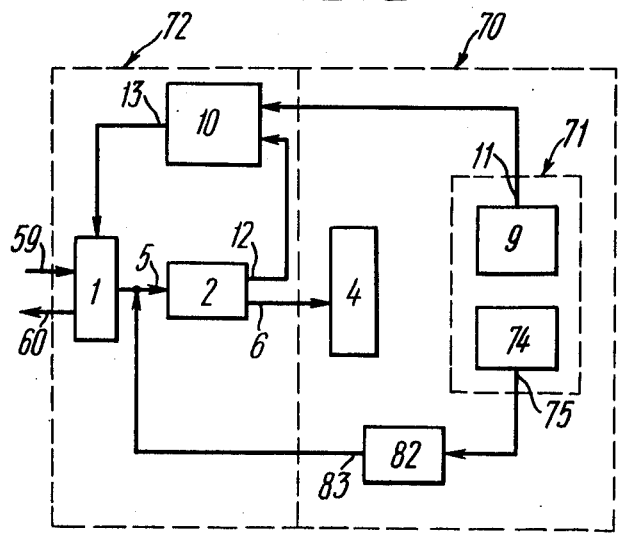
FIG. 10 is a functional diagram of the classroom for presenting educational information at the rate of the student's biological processes, according to the invention.
Figure 11:
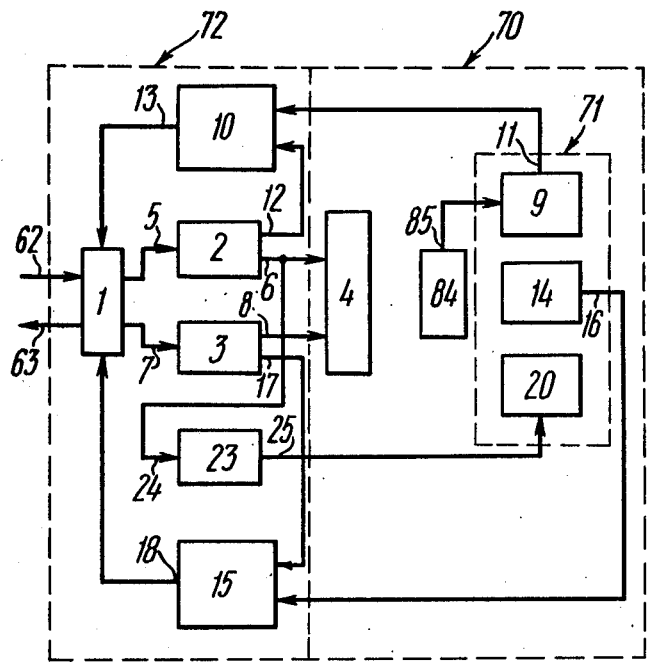
FIG. 11 is a functional diagram of the sensory-motor training classroom, according to the invention.
Figure 12:
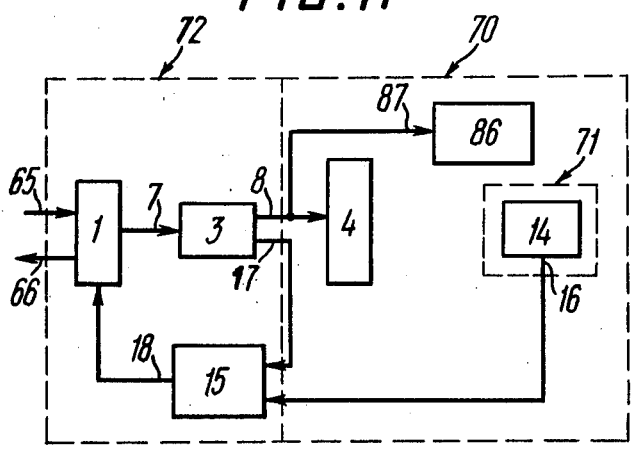
FIG. 12 is a functional diagram of the relaxation and programmed sleep classroom, according to the invention.
Figure 29:
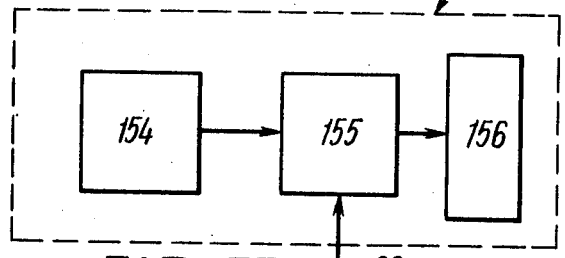
FIG. 29 is a functional diagram of the timing device, according to the invention.

The timing device 78 (FIG. 42) operates as follows. The capacitor 302 is charged through the circuit including the resistor 298 and the variable resistor 301. As soon as the charging level is reached, the transistor 297 starts to conduct. The amplified signal goes from the emitter of the transistor 297 to the base of the transistor 285 which is connected into the Schmitt flip-flop circuit comprising the transistors 285 and 286, resistor 287, resistor 289 and the capacitor 288, and resistors 290 and 291 which provide rated operating characteristics of the Schmitt flip-flop. The output signal is applied through the resistor 293 to the base of the power amplifier transistor 292 whose operating characteristics depend on the magnitude of the resistors 293 and 294. As the Schmitt flip flop and the power amplifier operate, the contacts 304 and 305 of the relay 303 close and the lamp 306 comes on. When a signal comes from the answer registering unit 9 (FIG. 9) through the input 80 to the relay 293, the contacts 294 and 295 (FIG. 42) close and shunt the capacitor 302 through the resistor 296. As a result, the charge across the capacitor 302 drops to zero, the contacts 304 and 305 of the relay 303 open and the lamp 306 goes out. After a time interval determined by the time constant of the circuit composed of the resistor 298, the variable resistor 301 and the capacitor 302, voltage across the capacitor 302 rises to the threshold level and the above process is repeated. If the student fails to answer before the timing device 78 operates, the lamp 306 lights up and remains on until the student gives an answer. After giving an answer, the student pushes the button transmitter 102 (FIG. 17) and the output 11 of the unit 9 (FIG. 9) sends a pulse to the input 80 of the discharge circuit 155 (FIG. 29). The discharge circuit 155 prevents operation of the light indicator 156 by removing a charge from the output of the time relay 154. If the student failed to give an answer in allotted time and the light indicator 156 has been actuated, it remains on until the student's next answer. Constructionally, the light indicator 156 is built into the answer registering unit 9 (FIG. 9). In a similar way, the students make exercises and solve problems when studying exact sciences in the classroom 55. In this case tasks in the form of exercises are set or assignments are formulated through the sensory perception channel. After a time interval required for solving a problem or making an exercise, the subsensory channel produces and answer or a key verbal message, i.e. a signal serving as a key for correct solving of the problem.

Another version of a session for bringing memorized material into active use is a student-to-machine dialogue. Questions in a foreign language are asked at the sensory perception level, then a time interval is allowed for an answer during which the student answers the question in a foreign language orally. After than a version of the correct answer to a given queri is conveyed into the earphones at the subsensory level.

Still another version of a session for bringing memorized material into active use is suggestive stimulation of the student's dialogue. In this case a situation is set up at the sensory level in a foreign language (when teaching foreign languages), and the students have to act in this situation in a foreign language. A version of the dialogue in a foreign language can be listened to in the earphones and at the same time through the subsensory channel.

The classroom 55 for bringing memorized material into active use may also be used for active assimilation of foreign language grammar. In this event an assignment is presented to the student at the sensory level and the student is asked to change certain sentences into various grammatical forms. After that a time interval is allowed which is equal to the allotted time of the student's answer and then versions of correct answers are conveyed to the student at the subsensory level.

The student's condition unit 3, the condition checking unit 15, the comparator unit 10, the answer registering unit 9, and the response registering unit 14 operate as described above.

As with the passive assimilation classroom 52, each teaching session in the classroom 55 for bringing memorized material into active use begins and ends with programmed selftraining which is described above together with the subsequent psychophysiological testing.

The classroom 58 for presenting information at the rate of the student's biological processes (FIG. 10) is intended for corrected presentation of lesson material at the rate of the student's biological processes and operates as follows. The student sits in the workplace 71 which is a chair with the built-in answer registering unit 9 and the assembly 74 of biotransmitters. In the course of a session the assembly 74 of biotransmitters registers the main biological processes of the student, such as electroencephalogram, pneumogram (respiration) and pulse rate. The timer unit 82 (FIG. 30) converts the registered biological processes into pulses following at a frequency equal to, respectively, the student's pulse rate, the dominant wave frequency ( $\alpha$ -wave of the electroencephalogram) and the respiration rate.

The timer 82 (FIG. 30) is intended for timing educational information signals with the student's biological processes, namely, with the respiration rate, pulse rate and the $\alpha$-wave frequency of the electroencephalogram. For each of the above parameters, the timer 82 has an individual circuit composed of the amplifier 157 and the shaper 158. Consider operation of one circuit of the timer 82 shown in FIG. 43. In each circuit the characteristics of the RC filter composed of the capacitors 314, 315 and 316 and the resistors 317, 318 and 319 are selected depending on the input frequency. The input of the circuit receives, through the capacitor 307, a signal from the assembly 74 (FIG. 10) of biotransmitters which is applied to the base of the transistor 308 (FIG. 43) connected as an emitter follower. Power-amplified signals are delivered to the base of the transistor 310, The resistor 312 stabilizes the D.C. operating point of the transistor and increases the input resistance of the transistor 310.

The output signals of the transistor 310 are delivered through the RC filter to the base of the transistor 308. The frequency characteristics of the RC filter are determined by the magnitudes of its components. The resonant frequency of the RC filter is found from the formula $$f = \frac{160,000}{R(Ohm).C(mF)}.$$

At a resonant frequency the resistance of the frequency-dependent circuit increases. Since the circuit is connected between the load of the transistor 310, resistor 311, and the input of the transistor 308, at the resonant frequency, the resistance of the RC filter is a maximum and, consequently, the gain of the stage at the resonant frequency is a maximum. Thus the stage composed of the transistors 308 and 310 is a frequency-dependent active filter. Filtered biological processes are delivered through the capacitor 313 to the base of the transistor 320. The resistors 322 and 323 supply D.C. voltage to the base of the transistor 320. The Schmitt flip-flop has two stable states which are set by filtered bioprocess signals applied to the base of the transistor 320. Thus pulses set up at the collector of the transistor 321. The Schmitt flip-flop output signals are delivered from the collector of the transistor 321 to the base of the transistor 329. The transistor 321 effects power amplification of the signals. The load of the transistor 321 is the relay 330. When pulses come to the relay from the Schmitt flip-flop, the contacts 331 and 332 close. These pulses control operation of the educational information unit 2 (FIG. 10) which comprises a remotely controlled filmstrip projector. The frames of the filmstrip are changed by the above signals. The student views educational information on the screen of the audio-visual display unit 4, the change of the frames containing this information being paced with the rate of one of the student's biological processes. Assimilation of the lesson material is registered by the answer registering unit 9. The comparator unit 10 operates as described above.

At the sessions of presenting information at the rate of biological processes, separate words (in foreign language teaching courses) are presented at the dominant electroencephalogram wave frequency (10 Hz). The student views separate words with parallel translation on the screen of the display unit. Each subsequent word is displayed on the screen one line below the previous word. In this case visual patterns are presented without appropriate soudn accompaniment.

When separate words are displayed at the pulse rate of the student, the audio signals (foreign words with simultaneous interpretation) are accompnaied by the visual display of these words with parallel translation.

When education information is presented at the student's respiration rate, lesson signals are lexical units with simultaneous interpretation synchronized with visual displays in the form of texts with parallel translation.

At sessions of presenting information at the student's pulse rate and respiration rate, the answer registering unit 9 registers assimilation of words and lexical units by the student at the recognition level.

Sessions of presenting educational information at the rate of the student's biological processes without simultaneous or parallel translation are used to monitor the student's progress in mastering educational information.

The sensory-motor classroom 61 (FIG. 11) is designed for electric stimulation of the student's motor performance when training him in sensory-motor skills. The student is placed in the chair 71 equipped with the response registering unit 14, the answer registering unit 9, and the electrodes assembly 20 which serves for applying electric pulse stimuli to the student. The room 70 comprises the trainer 84 for training the students in professional motor skills. When teaching typing, the trainer is a typewriter keyboard model. In the course of teaching the audio-visual display unit 4 presents educational information in the form of verbal instructions and verbal signals controlling the student's motor activity. The electrodes assembly 20 sends electric pulses stimulating muscular activity to the student's muscles at the rate of the audio and visual information presented to him.

The button transmitter 102 (FIG. 17) of the answer registering unit 9 (FIG. 11) is connected to the trainer 84. When working with the trainer 84, the student closes the contacts and the outputs of the answer registering unit 9 are applied to the comparator unit 10 which operates as shown above. In teaching typing, signals used for stimulating the student's muscles are usually sinewave signals of a varying amplitude delivered at a frequency of 80 Hz. The muscles which are involved in the professional motor performance being practiced are stimulated.

Each session in the sensory-motor classroom 61 also begins and ends with programmed self-training.

The relaxation and programmed sleep classroom 64 (FIG. 12) is intended for presenting audio and visual suggestively-contŕolled sleep and relaxation signals to the student and for monitoring the objective characteristics of the student's condition. At the relaxation and controlled sleep sessions the student is put in the workpiece 71 which is a bed with the response registering unit 14 attached thereto. Controlled sleep signals are verbal messages of programmed self-training and suggestive stimulation in combination with scene music containing beats at the rate of the biological processes occurring in a sleeping subject. By suggestion, the student is driven into a relaxation state and then into state of suggestively controlled sleep during which he receives performance control signals aimed at enhancing his performance after the sleep session. The effect of the suggestive control messages is checked by the response registering unit 14.

Figure 31:
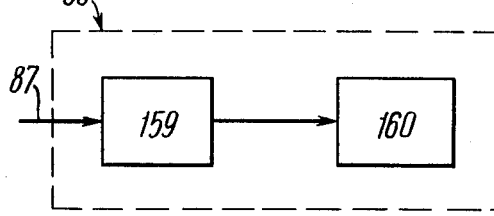
FIG. 31 is a structural diagram of the quasi-natural light stimulation unit, according to the invention.

The quasi-natural light stimulation unit 86 varies the illumination of the room in synchronism with suggestive control messages. Sync signals from the unit 3 come to the illumination control unit 159 (FIG. 31). The unit 159 controls the assembly 160 of the light sources. As the student is falling asleep, illumination of the room is gradually decreased so as to imitate night light. For awakening, a dawn is imitated followed by bright sunlight.

The sessions of self-training, relaxation, controlled day and night sleep are conducted in the classroom 64.

As the student is falling asleep, he is presented inhibitory scene signals whose volume is gradually decreased to zero.

At awakening, the student is offered programmed self-training signals and suggestive and subsensory signals aimed at enhancing his performance, in combination with stimulating scene signals whose volume is gradually increased from zero to the normal level.

During controlled night sleep session signals stimulating sleep are played during one hour gradually decreasing their volume to zero. Then, one hour before awakening, awakening signals are switched on and their volume is gradually increased.

Figure 32:
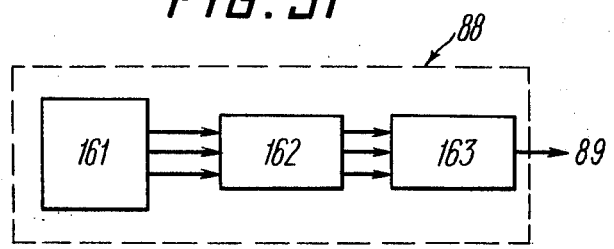
FIG. 32 is a structural diagram of the graded physical load unit, according to the invention.

The programmed rest classroom 67 (FIG. 13) is intended for presenting to the student active rest instructions and suggestive and subsensory condition control signals. The students are moved into the programmed rest classroom 67 in between teaching sessions. Active rest instructions and suggestive and subsensory condition control signals are presented to the student through the audio-visual display unit 4. In teaching foreign languages, audio and visual signals are entertainment movies in a respective foreign language. In addition, during this session the student receives a graded physical load from the graded physical load unit 88. The unit 88 applies a graded load to all the main muscles of the student. The student makes static physical exercises and performs dynamic physical exercises with the aid of the graded physical load unit 88 (FIG. 32).

Figure 44:
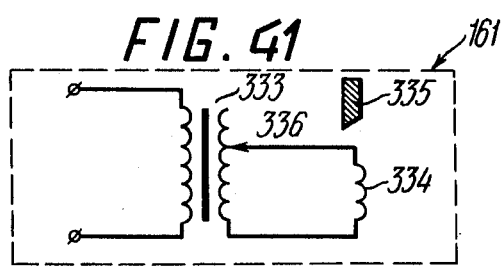
FIG. 44 is an electrical schematic diagram of the graded physical load unit, according to the invention.

The load grader 161 (FIG. 44) operates as follows. Voltage from the supply source is delivered to the terminals of the primary winding of the transformer 333, the secondary voltage of which is applied to the solenoid 334. The force of attraction of the armature 335 by the solenoid 334 depends on the position of the slider 336. Thus the force applied by the student to pull the armature 335 is regulated by the position of the slider 336.

Figure 13:
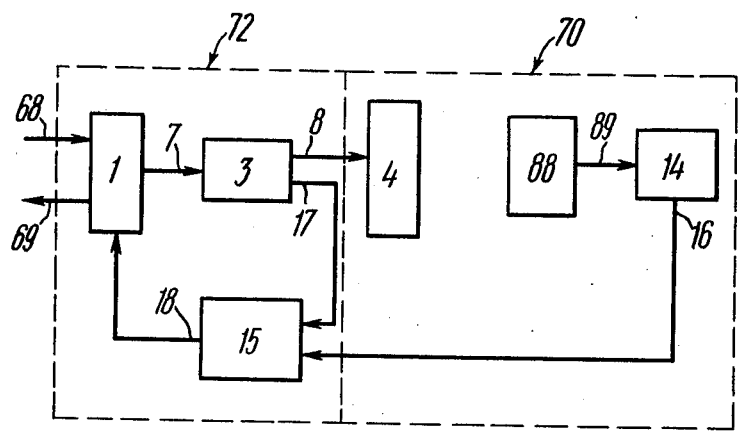
FIG. 13 is a functional diagram of the programed rest classroom, according to the invention.

The execution of physical exercises by the student is registered by the counter unit 162 and is transmitted through the switch 163 to the response registering unit 14 (FIG. 13). In the classroom 67 the students are also shown music or color music programs and movies.

The rooms 70 of each class are aesthetically finished with respect to the furniture, illumination, the color of the walls and the equipment so as to fit each particular session and teaching course.

The use of the present invention embodying the suggestocybernetic speedy training method for teaching foreign languages without a teacher makes it possible to acquire the command of a foreign language (for example, English, German or French) (3000-4000 words of passive vocabulary) within about 10-12 days of instruction, or within 80-100 educational hours.

The Japanese language course (1000-1300 hieroglyphs) can be memorized within as short a period as 15-20 days.

In teaching typing, the speed of 140-160 strokes per minute is attained by the trainee within 3 or 4 days of training.

In rapid reading training, the speed of reading is doubled within 2 or 3 days of training (without deterioration of the quality of reading).

The course of programming on an electric computer can be completed within 4 or 6 days of teaching.

The course of teaching theoretical subject matters in the scope of one university term (for example, theory of probability, political economy, social psychology) requires from 2 to 4 days of teaching.

The course of autogenic-training requires not more than 1-3 days.

Control system operators are trained in that skill during 2 to 10 days.

Linear drawing can be mastered in about 3 to 4 days.

A command of shorthand can be acquired within 4-7 days of training.

When using this method, the above durations of the teaching courses are provided for students who have been subjected to testing prior to starting the course.

The results of remote follow-up of the students' progress testify to a high quality of assimilating educational material, in the absence of practice not more than 40-50% of the learnt information is lost during one year.

Medical check-ups of the students' condition point to the absence of excessive stress or fatigue of the students during the entire learning period.

The present invention is applicable not only for speedy teaching of professional skills and subject matters, but also for stimulating creative imagination and for psychotherapeutic and psychohygienic effects.

What is claimed is:

1. An audio-visual teaching machine for speedy training, comprising:
  an operator's console intended for switching various units and tutoring programs in a required sequence;
  an educational information unit designed for playing back pre-recorded lesson information, instructions and service signals, with the input thereof connected to a respective output of said operator's console;
  a student's performance control unit which is a facility for playing back signals to control said student's psychophysiological condition and his performance, with the input thereof connected to a respective output of said operator's console; an audio-visual display unit for presenting aural and visual signals to the student, respective inputs of which connect one output of said educational information unit and one output of said student's performance control unit;
  an answer registering unit designed for registering the student's answers to educational information signals;
  a comparator unit which compares the number of the student's answers to a certain amount of lesson material with the reference number of answers and generates a signal indicating a required number of reviews of said amount of educational material, wherein one input is connected to an output of said answer registering unit, the other input is connected to the other output of said educational information unit, and the output is connected to a respective input of said operator's console;
  a student's response registering unit intended for registering said student's phychophysiological responses;

a student's condition checking unit which is a facility for evaluating the psychophysiological parameters of said student and comparing them with the reference values, wherein one input is connected to an output of said student's response registering unit, the other input is connected to the other output of said student's performance control unit, and the output is connected to a respective input of said operator's console.

2. A machine as set forth in claim 1, which comprises a biostimulation unit having a facility for generating electric pulses to stimulate electrically active points of a human body, the input of which is connected to a respective output of said operator's console; and an assembly of electrodes to be attached to the student's body for transmitting electric pulses to the surface of said student's body, with an input thereof connected to an output of the biostimulation unit.

3. A machine as set forth in claim 1, which comprises a student's motor activity control unit having a facility for generating electric pulses controlling the student's muscular performance, the input of which is connected to one output of said educational information unit; and an assembly of electrodes to be attached to said student's body for transmitting electric pulses to said student's muscles, with the input thereof connected to an output of said motor activity control unit.

4. A machine as set forth in claim 2, which comprises a student's motor activity control unit having a facility for generating electric pulses controlling the student's muscular performance, the input of which is connected to one output of said educational information unit; and an assembly of electrodes to be attached to said student's body for transmitting electric pulses to said student's muscles, with the input thereof connected to an output of said motor activity control unit.

5. A machine as set forth in claim 1 in which said student's performance control unit is a facility for automatic playback of psychophsiological test messages, programmed selftraining signals, suggestive and subsensory control signals, exterior stimuli and functional scene signals, and comprises a tests unit, a self-training unit, a suggestive signal producing unit, a subsensory signal producing unit, an exterior stimulus producing unit, and a functional scene unit, the inputs of which are interconnected and serve as the inputs of said student's performance control unit; and an adder with the respective inputs thereof connecting one output of said tests unit and the outputs of said self-training unit, said suggestive signal producing unit, said subsensory signal producing unit, said exterior stimulus producing unit and said functional scene unit, an output of said adder is one output of said student's performance control unit, whereas the other output of said tests unit is the other output of said student's performance control unit.

6. A machine as set forth in claim 2, in which said student's performance control unit is a facility for automatic playback of psychophysiologial test messages, programmed selftraining signals, suggestive and subsensory control signals, exterior stimuli and functional scene signals, and comprises a tests unit, a self-training unit, a suggestive signal producing unit, a subsensory signal producing unit, an exterior stimulus producing unit, and a functional scene unit, the inputs of which are interconnected and serve as the input of said student's performance control unit; and an adder with the respective inputs thereof connecting one output of said tests unit and the outputs of said self-training unit, said suggestive signal producing unit, said subsensory signal producing unit, said exterior stimulus producing unit and said functional scene unit; an output of said adder is one output of said student's performance control unit, whereas the other output of said tests unit is the other output of said student's performance control unit.

7. A machine as set forth in claim 3, in which said student's performance control unit is a facility for automatic playback of psychophysiological test messages, programmed self-training signals, suggestive and subsensory control signals, exterior stimuli and functional scene signals, and comprises a tests unit, a self-training unit, a suggestive signal producing unit, a subsensory signal producing unit, an exterior stimulus producing unit, and a functional scene unit, the inputs of which are interconnected and serve as the input of said student's performance control unit; and an adder with the respective inputs thereof connecting one output of said tests unit an the outputs of said self-training unit, said suggestive signal producing unit, said subsensory siganal producing unit, said exterior stimulus producing unit and said functional scene unit; an output of said adder is one output of said student's performance control unit, whereas the other output of said tests unit is the other output of said student's performance control unit.

8. A machine as set forth in claim 4, in which said student's performance control unit is a facility for automatic playback of psychophysiological test messages, programmed selftraining signals, suggestive and subsensory control signals, exterior stimuli and functional scene signals, and comprises a tests unit, a self-training unit, a suggestive signal producing unit, a subsensory signal producing unit, an exterior stimulus producing unit, and a functional scene unit, the inputs of which are interconnected and serve as the input of said student's performance control unit; and an adder with the respective inputs thereof connecting one output of said tests unit and the outputs of said self-training unit, said suggestive signal producing unit, said subsensory signal producing unit, said exterior stimulus producing unit and said functional scene unit, an output of said adder is one output of said student's performance control unit, whereas the other output of said tests unit is the other output of said student's performance control unit.

9. An instruction center, comprising:
 a central console for controlling the instruction center;
 a classroom for testing and checking the student's condition intended for presenting to the student psychophysiological messages, special tests and programmed self-training signals and for registering said student's electrophysiological characteristics and responses, in which an input is connected to a respective output of said central console, and an output is connected to a respective input of said central console;
 a classroom for stimulating the student's performance and for suggestive control of his condition intended for presenting to the student suggestive and subsensory condition control messages, programmed self-training signals and reflex reinforcement signals, in which an input is connected to a respective output of said central console, and an output is connected to a respective input of said central console;

a classroom for passive assimilation of educational material where the student is presented synchronized audio and visual lesson material signals and instructions, in which an input is connected to a respective output of said central console, and an output is connected to a respective input of said central console;

a classroom for bringing memorized material into active use where educational information is presented to the student in a suggestive form that stimulates the student's verbal performance, in which an input is connected to a respective output of said central console, and an output is connected to a respective input of said central console;

a classroom for presenting educational information at the rate of the student's biological processes where presentation of educational material is paced with one of the main biological processes of said student, in which an input is connected to a respective output of said control console, and an output is connected to a respective input of said central console;

a sensory-motor training classroom for teaching professional motor skills by presenting to the student educational information signals in synchronism with muscular performance stimulating signals, in which an input is connected to a respective output of said central console, and an output is connected to a respective input of said central console;

a relaxation and programmed sleep classroom with self-training sessions intended for enhancing the student's performance and for controlled sleep sessions, in which an input is connected to a respective output of said central console, and an output is connected to a respective input of said central console;

a programmed rest classroom for active rest of the student between the teaching sessions, in which an input is connected to a respective output of said central console, and an output is connected to a respective input of said central console;

an audio-visual teaching machine for speedy training which is provided in each of said classrooms, comprising:

an operator's console for switching various units and tutoring programs in a required sequence;

an educational information unit designed for playing back pre-recorded lesson information, instructions and service signals, with the input thereof connected to a respective output of said operator's console;

a student's performance control unit which is a facility for playing back signals to control said student's psychophysiological condition and his performance, the input of which is connected to a respective output of said operator's console;

an audio-visual display unit for presenting aural and video signals to the student, the respective inputs of which connect one output of said educational information unit and one output of said student's performance control unit;

an answer registering unit designed for registering the student's answers to educational information signals;

a comparator unit which compares the number of the student's answers to a certain amount of lesson material with the reference number of answers and generates a signal indicating a required number of reviews of said amount of educational material, and in which one input is connected to an output of said answer registering unit, the other input is connected to the other output of said educational information unit, and an output is connected to a respective input of said operator's console;

a student's response registering unit intended to register said student's psychophysiological responses;

a student's condition checking unit which is a facility for evaluating said student's psychophysiological parameters and comparing them with the reference values, in which one input is connected to an output of said student's response registering unit, the other input is connected to the other output of said student's performance control unit, and an output is connected to a respective input of said operator's console.

10. An instruction center as set forth in claim 9 in which the audio-visual teaching machine for speedy training additionally comprises a biostimulation unit having a facility for generating electric pulses to stimulate electrically active points of a human body, the input of which is connected to a respective output of said operator's console; and an assembly of electrodes to be attached to the student's body for transmitting electric pulses to the surface of said student's body, with the input thereof connected to the output of the biostimulation unit.

11. An instruction center as set forth in claim 9 in which the audio-visual teaching machine for speedy training additionally comprises a motor activity control unit having a facility for generating electric pulses controlling the student's muscular performance, the input of which is connected to one output of said educational information unit; and an assembly of electrodes to be attached to said student's body for transmitting electric pulses to said student's muscles, with the input thereof connected to an output of said motor activity control unit.

12. An instruction center as set forth in claim 9, in which the audio-visual teaching machine for speedy training additionally comprises: a biostimulation unit having a facility for generating electric pulses to stimulate electrically active points of a human body, with its input connected to a respective output of said operator's console; a student's motor activity control unit having a facility for generating electric pulses to control the student's muscular performance, with the input thereof connected to one output of said educational information unit; an assembly of electrodes to be attached to said student's body, one input of which is connected to an output of said biostimulation unit and the other input is connected to an output of said motor activity control unit; a student's performance control unit which is a facility for automatic presentation of psychophysiological testing signals, programmed self-training signals, suggestive control messages, subsensory control messages, exterior stimuli and functional scene signals, and comprises a tests unit, a self-training unit, a suggestive signal producing unit, a subsensory signal producing unit, an exterior stimulus producing unit, a functional scene unit, the inputs of these units being interconnected and serving as an input of said student's performance control unit, and also comprises an adder with its respective inputs connecting one output of said tests unit and the outputs of said self-training unit, said suggestive signal producing unit, said subsensory signal producing unit, said exterior stimulus producing unit and said functional scene unit; the output of said adder is one output of said student's performance control unit and the other output of said tests unit is the other output of said student's performance control unit.

13. An instruction center as set forth in claim 12 in which said student's testing and condition checking classroom comprises said operator's console, said educational information unit, said student's performance control unit, said audio-visual display unit, said answer registering unit, said comparator unit, said response registering unit, said student's condition checking unit, said biostimulation unit, said assembly of electrodes of said audiovisual teaching machine for speedy training, and said testing classroom also comprises an assembly of biotransmitters attached to the student's body and a multi-parameter recorder for recording said student's biological processes, the input of which is connected to an output of said assembly of biotransmitters, and said operator's console has an additional input and an additional output which are, respectively, an input and an output of said testing classroom; and said classroom for stimulating the student's performance and for suggestive control of his condition comprises said operator's console, said performance control unit, said audio-visual display unit, said student's response registering unit, said student's condition checking unit, said biostimulation unit, said assembly of electrodes of said audiovisual teaching machine for speedy training, and said stimulation classroom also comprises a reflex reinforcement unit for amplifying suggestive messages, the input of which is connected to one output of said performance control unit, and said operator's console has an additional input and an additional output which, are, respectively, an input and an output of said stimulation classroom.

14. An instruction center as set forth in claim 13, in which said classroom for passive assimilation of educational material comprises said operator's console, said educational information unit, said student's performance control unit, said audio-visual display unit, said answer registering unit, said comparator unit, said response registering unit, said student's condition checking unit of said audio-visual teaching machine, and said operator's console has an additional input and an additional output which are, respectively, an input and an output of said passive assimilation classroom; and said classroom for bringing memorized material into active use comprises said operator's console, said educational information unit, said student's performance control unit, said audio-visual display unit, said answer registering unit, said comparator unit, said response registering unit, said student's condition checking unit of said audio-visual teaching machine, and said classroom for bringing memorized material into active use also comprises an earphone unit with the input thereof connected to one output of said educational information unit, and a timing device for generating a light signal if the student fails to give an answer to an educational information signal in allotted time, the input of which is connected to an output of said answer registering unit, said operator's console has an additional input and an additional output which are, respectively, an input and an output of said classroom for bringing memorized material into active use.

15. An instruction center as set forth in claim 13 in which said classroom for presenting educational information at the rate of the student's biological processes comprises said operator's console, said educational information unit, said audio-visual display unit, said answer registering unit, said comparator unit of said audio-visual teaching machine, and said classroom for presenting educational information at the rate of the student's biological processes also comprises an assembly of biotransmitters and a timer for synchronizing the rate of presenting educational information with one of the student's main biological processes, the input of which is connected to an output of said biotransmitters assembly, and an output is connected to an input of said educational information unit, said operator's console has an additional input and an additional output which are, respectively, an input and an output of said classroom for presenting educational information at the rate of the student's biological processes.

16. An instruction center as set forth in claim 13, in which said sensory-motor training classroom comprises said operator's console, said educational information unit, said student's performance control unit, said audio-visual display unit, said answer registering unit, said comparator unit, said response registering unit, said student's condition checking unit, said electrodes assembly, said motor activity control unit of said audio-visual teaching machine, and said sensory motor training classroom also comprises a trainer for exercising professional motor skills, the output of which is connected to an input of said answer registering unit, said opertor's console has an additional input and an additional output which are, respectively, an input and an output of said sensory motor training classroom.

17. An instruction center as set forth in claim 13, in which said relaxation and programmed sleep classroom comprises said operator's console, said student's performance control unit, said audio-visual display unit, said response registering unit, said student's condition checking unit of said audio-visual teaching machine, and said relaxation and programmed sleep classroom also comprises a quasi-natural light stimulation unit for imitating natural illumination in various situations, with the input thereof connected to one output of said student's performance control unit, said operator's console has an additional input and an additional output which are, respectively, an input and an output of said relaxation and programmed sleep classroom.

18. An instruction center as set forth in claim 13, in which said programmed rest classroom comprises said operator's console, said student's performance contol unit, said audiovisual display unit, said response registering unit, said student's condition checking unit of said audio-visual teaching machine, and said programmed rest classroom also comprises a graded physical load unit the output of which is connected to an input of said response registering unit, said operator's console has an additional input and an additional output which are, respectively, an input and an output of said programmed rest classroom.

19. An instruction center as set forth in claim 14, in which said classroom for presenting educational information at the rate of the student's biological processes comprises said operator's console, said educational information unit, said audio-visual display unit, said answer registering unit, said comparator unit of said audio-visual teaching machine and said classroom for presenting educational material at the rate of the student's biological processes also comprises an assembly of biotransmitters and a timer for synchronizing the rate of presenting educational information with the student's main biological processes, an input of which is connected to an output of said biotransmitters assembly, and an output is connected to an input of said educational information unit, and said operator's console has an additional input and an additional output which are, respectively, an input and output of said classroom for presenting educational information at the rate of the student's biological processes.

20. An instruction center as set forth in claim 14, in which said relaxation and programmed sleep classroom comprises said operator's console, said student's performance control unit, said audio-visual display unit, said student's response registering unit, said student's condition checking unit of said audio-visual teaching machine, and said relaxation and programmed sleep classroom also comprises a quasi-natural light stimulation unit for limiting natural illumination in various situation, with the input thereof connected to one output of said student's performance control unit, and said operator's console has an additional input and an additional output which are, respectively, an input and an output of said relaxation and programmed sleep classroom.

21. An instruction center as set forth in claim 14, in which said programmed rest classroom comprises said operator's console, said student's performance control unit, said audiovisual display unit, said student's response registering unit, said student's condition checking unit of said audio-visual teaching machine, and said programmed rest classroom also comprises a graded physical load unit with the output thereof connected to an input of said response registering unit, said operator's console has an additional input and an additional output which are, respectively, an input and an output of said programmed rest classroom.

22. An instruction center as set forth in claim 16, in which said relaxation and programmed sleep classroom comprises said operator's console, said student's performance control unit, said audio-visual display unit, said student's response registering unit, said student's condition checking unit of said audio-visual teaching machine, and said relaxation and programmed sleep classroom also comprises a quasi-natural light stimulation unit for imitating natural illumination in various situations, with the input thereof connected to one output of said student's performance control unit, and said operator's console has an additional input and an additional output which are, respectively, an input and an output of said relaxation and controlled sleep classroom.

23. An instruction center as set forth in claim 16, in which said programmed rest classroom comprises said operator's console, said student's performance control unit, said audio-visual visual display unit, said student's response registering unit, said student's condition checking unit of said audio-visual teaching machine, and said programmed rest classroom also comprises a graded physical load unit with the output thereof connected to an input of said response registering unit, and said operator's console has an additional input and additional output which are, respectively, an input and an output of said programmed rest classroom.

24. An instruction center as set forth in claim 19, in which said relaxation and prgrammed sleep classroom comprises said operator's console, said student's performance control unit, said audio-visual display unit, said student's response registering unit, said student's condition checking unit of said audio-visual teaching machine, and said relaxation classroom also comprises a quasi-natural light stimulation unit for imitating natural illumination in various situations, with the input thereof connected to one output of said student's performance control unit, and said operator's console has an additional input and an additional output which are, respectively, an input and an output of said relaxation and programmed sleep classroom.

25. An instruction center as set forth in claim 19, in which said programmed rest classroom comprises said operator's console, said student's performance control unit, said audio-visual display unit, said student's response registering unit, said student's condition checking unit of said audio-visual teaching machine, and said programmed rest classroom also comprises a graded physical load unit with the output thereof connected to an input of said response registering unit, and said operator's console has an additional input and an additional output which are, respectively, an input and an output of said programmed rest classroom.

26. An instruction center as set forth in claim 24, in which said programmed rest classroom comprises said operator's console, said student's performance control unit, said audio-visual display unit, said student's response registering unit, said student's condition checking unit of said audio-visual teaching machine, and said programmed rest classroom also comprises a graded physical load unit with the output thereof connected to an input of said response registering unit, and said operator's console has an additional input and an additional output which are, respectively, an input and an output of said programmed rest classroom.

27. A speedy training method which consists of the following sequence of operations:
preformed and recorded audio-visual instruction signals, psychophysiological testing signals, self-training signals, suggestive control messages, subsensory control messages, functional scene signals, signals of special tests on a particular subject matter being studied in the form of a session for testing the student, reference values of responses to psychophysiological tests, a reference number of answers to special test signals, and data on characteristics of various groups of students are incorporated in the teaching machine;
said student's biological characteristics are registered before the start of said testing session;
said instruction and self-training signals are presented to said student simultaneously with said functional scene signals;
said student's biological characteristics are registered after said self-training signals have been presented to him;
said psychophysiological testing signals are presented to said student;
said student's responses to said psychophysiological testing signals are registered;
said signals of special tests on a particular subject matter being studied are presented to said student;
said student's answers to said special testing signals are registered;
on the basis of the registered biological characteristics, responses and answers of the student, said student is assigned to a particular group;

preformed and recorded audio-visual instruction signals, suggestive and subsensory messages, functional scene and psychophysiological testing signals, reflex reinforcement signals in the form of a performance stimulation session for controlling the student's performance, and reference response values for different performance levels are incorporated in the teaching machine;

said instruction signals, suggestive control messages and psychophysiological testing signals are presented to said student simultaneously with said functional scene signals;

said student's responses to said psychophysiological testing signals are registered;

the level of said student's performance is determined from the registered response data;

said reflex reinforcement signals, suggestive and subsensory control messages are presented to said student;

said student's responses are registered;

the level of said student's performance is estimated;

said operations of the performance stimulation session are repeated until said student's performance reaches a desired level;

preformed and recorded audio-visual instruction signals, educational information and self-training signals, suggestive and subsensory control messages, exterior stimuli, psychophysiological testing signals in the form of teaching sessions for said student, reference values of responses to estimate the performance level, a reference number of answers for each teaching session, and the performance level value are incorporated in the teaching machine;

said instruction and educational information signals are presented to said student;

said student's answers are registered;

the representation of said educational information signals is interrupted randomly;

said exterior stimuli are applied after the previous operation with a view to maintaining and restoring the subsiding orientation response of said student;

the representation of educational information signals is regularly interrupted;

after the previous operation said psychophysiological testing signals are presented;

said student's responses are registered;

said student's performance level is determined;

if the student's performance level deviates from the preset value, the functional scene is changed depending on the magnitude and sign of the deviation, and said subsensory and suggestive control messages are presented to said student together with educational information signals;

the presentation of said educational information signals and subsensory and suggestive control messages is interrupted;

said psychophysiological testing signals are presented;

said student's responses are registered;

said student's performance level is determined;

if the performance level of said student has been restored, said educational information signals are presented without said suggestive and subsensory control messages;

if the deviation of said student's performance from the preset level persists, said self-training and psychophysiological testing signals are presented to said student;

said student's responses are registered;

said student's performance level is estimated;

said self-training and psychophysiological testing signals are presented within a preset time period until said student's performance has reached a desired level;

if the deviation of said student's performance from the preset level still persists after the elapse of a predetermined time period, said teaching session is interrupted;

said performance stimulation session is conducted;

after the performance has reached a desired level, said interrupted teaching session is resumed;

after said teaching session has been completed, the number of said student's answers is compared with the reference number of answers;

if the number of said student's answers is equal to the reference number of answers, further teaching is conducted in accordance with a preset program for a given group of students;

if the number of said student's answers is not equal to the reference number of answers, the number of reviews of said teaching session and the sequence of the sessions are changed depending on the magnitude and sign of said deviation;

educational information signals in the form of presenting educational information to the student at the rate of his biological processes and the reference number of answers are incorporated in the teaching machine;

said educational information signals are synchronized with one of the main biological processes of said student;

said educational information signals are presented to said student;

said student's answers are registered;

after the completion of said session of presenting educational information at the rate of the student's biological processes the number of said student's answers is compared with the reference number of answers;

if the number of said student's answers is equal to the reference number of answers, further teaching is conducted according to a preset program;

if the number of said student's answers deviates from the reference number of answers, the teaching program is changed depending on the magnitude and sign of said deviation;

after the completion of the teaching sessions, reference educational information signals in the form of the student's proficiency checking session a reference number of answers are incorporated in the teaching machine;

the reference educational information signals are presented to said student;

said student's answers are registered;

if the number of said student's answers is smaller than the reference number of answers, additional teaching sessions are conducted; and if the number of said student's answers is equal to, or larger than, the reference number of answers, the teaching process is stopped.

28. A method as set forth in claim 27, whereby for expanding the student's performance control range:

electric pulses to stimulate electrically active points of a human body are incorporated in the teaching machine;

in the course of a testing session the electrically active points of said student's body are stimulated by said electric pulses;

said student's biological characteristics are registered according to the nature of change in said biological characteristics, said student is graded;

in the course of teaching sessions the performance level of said student is estimated; and should said student's performance deviate from the preset level, said electric pulses are applied to stimulate the electrically active points of said student's body.

29. A method as set forth in claim 27, whereby for speedy teaching of foreign languages:

preformed and recorded instructions and signals of basic and supplementary educational information are incorporated in the teaching machine, said signals of basic and supplementary educational information being texts and words in a foreign language with parallel translation, which are presented to the student at sessions of passive assimilation of educational information, sessions of bringing memorized material into active use, sessions of presenting tutorial information at the rate of the student's biological processes, and the proficiency checking sessions;

the instruction signals and the signals of the basic and supplementary educational information are presented to the student in the form of sessions of passive assimilation of educational material;

said student's answers at the level of recognizing foreign words and phrases are registered;

said student is presented instruction signals and the signals of the basic and supplementary educational information at sessions of bringing memorized material into active use, where the basic educational information is offered in the form of tasks and questions at the sensory level, while the supplementary lesson material is presented in the form of key signals and answers at the threshold level;

said student's answers at the level of reproducing foreign words and phrases are registered;

presentation of foreign words and phrases with parallel translation is paced with one of said student's main biological processes;

said student is presented said foreign words and phrases at sessions of offering educational material at the rate of his biological processes;

said student's answers are registered;

said student is presented signals of the basic educational information without parallel translation at proficiency checking sessions; and said student's answers at the level of reproducing the educational material are registered;

30. A method as set forth in claim 27, whereby for speedy training in professional motor skills:

electric signals for controlling said student's muscular activity to control his performance are incorporated in the teaching machine;

said electric signals are timed with the educational information signals; and in the course of training said synchronized electric signals are used to stimulate said student's muscles involved in the motor skill being taught.

31. A method as set forth in claim 27, whereby for rest and restoring the student's performance:

preformed and recorded instruction signals, suggestive and subsensory control messages, functional scene signals in the form of an active rest session, and entertainment music and movie programs are incorporated in the teaching machine;

suggestive and subsensory control messages are presented together with functional scene signals;

the student is given said instructions to perform a series of physical exercises;

said physical exercises are prescribed in accordance with the age and physical development of said student;

the number of physical exercises performed by said student is registered;

entertainment music and movie programs are presented; and functional scene signals are presented.

32. A method as set forth in claim 28, whereby for speedy teaching of foreign languages:

preformed and recorded instructions and signals of basic and supplementary educational information are incorporated in the teaching machine, said signals of basic and supplementary educational information being texts and words in a foreign language with parallel translation, which are presented to the student at sessions of passive assimilation of educational information, sessions of bringing memorized material into active use, sessions of presenting tutorial information at the rate of the student's biological processes, and the proficiency checking sessions;

the instruction signals and the signals of the basic and supplementary educational information are presented to the student in the form of sessions of passive assimilation of educational material;

said student's answers at the level of recognizing foreign words and phrases are registered;

said student is presented instructional signals and the signals of the basic and supplementary educational information at sessions of bringing memorized material into active use, where the basic educational information is offered in the form of tasks and questions at the sensory level, while the supplementary lesson material is presented in the form of key signals and answers at the threshold level;

said student's answers at the level of reproducing foreign words and phrases are registered;

presentation of foreign words and phrases with parallel translation is paced with one of said student's main biological processes;

said student is presented said foreign words and phrases at sessions of offering educational material at the rate of his biological processes;

said student's answers are registered;

said student is presented signals of the basic educational information without parallel translation at proficiency checking sessions; and said student's answers are registered at the level of reproducing the educational material.

33. A method as set forth in claim 28, whereby the speedy training of professional motor skills:

electric signals for controlling said student's muscular activity to control his performance are incorporated in the teaching machine;

said electric signals are timed with the educational information signals; and in the course of training said synchronized electric signals are used to stimulate said student's muscles involved in the motor skill being taught.

34. A method as set forth in claim 28, whereby for rest and restoring the student's performance:
- preformed and recorded instruction signals, suggestive and subsensory control messages, functional scene signals in the form of an active rest session, and entertainment music and movie programs are incorporated in the teaching machine;
- suggestive and subsensory control messages are presented together with functional scene signals;
- the student is given said instructions to perform a series of physical exercises;
- said physical exercises are prescribed in accordance with the age and physical development of said student;
- the number of physical exercises performed by said student is registered;
- entertainment music and movie programs are presented; and
- said functional scene signals are presented.

35. A method as set forth in claim 29, whereby for rest and restoring the student's performance:
- preformed and recorded instruction signals, suggestive and subsensory control messages, functional scene signals in the form of an active rest session, and entertainment music and movie programs are incorporated in the teaching machine;
- suggestive and subsensory control messages are presented together with functional scene signals;
- the student is given said instructions to perform a series of physical exercises;
- said physical exercises are prescribed in accordance with the age and physical development of said student;
- the number of physical exercises performed by said student is registered;
- entertainment music and movie programs are presented; and
- said functional scene signals are presented.

36. A method as set forth in claim 30, whereby for rest and restoring the student's performance:
- preformed and recorded instruction signals, suggestive and subsensory control messages, functional scene signals in the form of an active rest session, and entertainment music and movie programs are incorporated in the teaching machine;
- said suggestive and subsensory control messages are presented together with functional scene signals;
- the student is given said instructions to perform a series of physical exercises;
- said physical exercises are prescribed in accordance with the age and the physical development of said student;
- the number of physical exercises performed by said student is registered;
- entertainment music and movie programs are presented; and
- said functional scene signals are presented.

37. A method as set forth in claim 32, whereby for rest and restoring the student's performance:
- preformed and recorded instruction signals, suggestive and subsensory control messages, functional scene signals in the form of an active rest session, and entertainment music and movie programs are incorporated in the teaching machine;
- said suggestive and subsensory control messages are presented together with functional scene signals;
- the student is given said instruction to perform a series of physical exercises;
- said physical exercises are prescribed in accordance with the age and the physical development of said student;
- the number of physical exercises performed by said student is registered;
- entertainment music and movie programs are presented; and
- said functional scene signals are presented.

38. A method as set forth in claim 33, whereby for rest and restoring the student's performance:
- preformed and recorded instruction signals, suggestive and subsensory control messages, functional scene signals in the form of an active rest session, and entertainment music and movie programs are incorporated in the teaching machine;
- said suggestive and subsensory control messages are presented together with functional scene signals;
- the student is given said instructions to perform a series of physical exercises;
- said physical exercises are prescribed in accordance with the age and the physical development of said student;
- the number of physical exercises performed by said student is registered;
- entertainment music and movie programs are presented; and
- said functional scene signals are presented.

* * * * *